US010027586B2

(12) United States Patent
Kielhofner et al.

(10) Patent No.: US 10,027,586 B2
(45) Date of Patent: Jul. 17, 2018

(54) NETWORK ADDRESS FAMILY TRANSLATION METHOD AND SYSTEM

(71) Applicant: Star2Star Communications LLC, Sarasota, FL (US)

(72) Inventors: Kristian Kielhofner, Sarasota, FL (US); Norman A. Worthington, III, Sarasota, FL (US)

(73) Assignee: Star2Star Communications, LLCDE (US)

( * ) Notice: Subject to any disclaimer, the term of this patent is extended or adjusted under 35 U.S.C. 154(b) by 0 days.

(21) Appl. No.: 15/401,423

(22) Filed: Jan. 9, 2017

(65) Prior Publication Data
US 2017/0187620 A1 Jun. 29, 2017

Related U.S. Application Data

(63) Continuation of application No. 13/841,929, filed on Mar. 15, 2013, now Pat. No. 9,699,069.

(51) Int. Cl.
*H04L 12/749* (2013.01)
*H04L 12/721* (2013.01)
*H04L 29/06* (2006.01)
*H04L 29/12* (2006.01)

(52) U.S. Cl.
CPC .......... *H04L 45/741* (2013.01); *H04L 45/14* (2013.01); *H04L 61/256* (2013.01); *H04L 61/2585* (2013.01); *H04L 65/1006* (2013.01); *H04L 69/16* (2013.01); *H04L 61/2514* (2013.01)

(58) Field of Classification Search
CPC ........ H04L 45/741; H04L 45/14; H04L 69/16
See application file for complete search history.

(56) References Cited

U.S. PATENT DOCUMENTS 5,732,072 A * 3/1998 Thanner ................. H04L 45/02
370/255
6,298,043 B1 * 10/2001 Mauger ............... H04L 12/5601
370/230

(Continued)

OTHER PUBLICATIONS

Mell, Peter, and Tim Grance. "The NIST definition of cloud computing." (2011). APA.*

(Continued)

*Primary Examiner* — Jimmy H Tran
(74) *Attorney, Agent, or Firm* — Katharyn E. Owen

(57) ABSTRACT

The present invention, generally, is directed towards an Internet protocol (IP) address family translation system and method. Such application is directed towards providing the ability to send and receive communications sessions between communication nodes, network edge devices, and the like, using more than one Internet protocol. This application is especially advantageous where communication sessions need to be transferred from one location to a second using the public Internet, i.e., Internet access provided by third-party Internet service providers (ISPs). The present invention, also, provides a translation system and method which may allow a communication node or a network edge device to recognize and interpret communication sessions received over a third-party Internet connection from a device hidden by a third party ISP-provided NAT implementation.

58 Claims, 7 Drawing Sheets

(56) References Cited

U.S. PATENT DOCUMENTS

| | | | | |
|---|---|---|---|---|
| 7,465,231 B2* | 12/2008 | Lewin | A63F 13/12 | |
| | | | 463/29 | |
| 8,149,716 B2* | 4/2012 | Ramanathan | H04L 45/123 | |
| | | | 370/238 | |
| 8,184,620 B2* | 5/2012 | Dusch | H04L 29/06027 | |
| | | | 370/352 | |
| 8,289,979 B2* | 10/2012 | Hiie | H04L 45/00 | |
| | | | 370/389 | |
| 8,325,638 B2* | 12/2012 | Jin | H04L 12/14 | |
| | | | 370/310 | |
| 8,351,333 B2* | 1/2013 | Rao | H04L 1/1854 | |
| | | | 370/235 | |
| 8,369,213 B2* | 2/2013 | Vasseur | H04L 12/4633 | |
| | | | 370/216 | |
| 8,392,583 B2* | 3/2013 | Bijwaard | H04N 21/6405 | |
| | | | 709/227 | |
| 8,675,493 B2* | 3/2014 | Buddhikot | H04L 45/12 | |
| | | | 370/216 | |
| 8,737,371 B2* | 5/2014 | Velev | H04W 8/082 | |
| | | | 370/338 | |
| 8,767,532 B2* | 7/2014 | Vasseur | H04L 12/4633 | |
| | | | 370/216 | |
| 8,798,036 B2* | 8/2014 | K t | H04L 12/66 | |
| | | | 370/352 | |
| 8,879,426 B1* | 11/2014 | Quilling | H04W 40/20 | |
| | | | 370/245 | |
| 8,930,552 B2* | 1/2015 | Ueno | H04L 45/42 | |
| | | | 370/229 | |
| 9,491,004 B2 | 11/2016 | Park | | |
| 2002/0010798 A1* | 1/2002 | Ben-Shaul | G06F 17/3089 | |
| | | | 709/247 | |
| 2004/0003117 A1* | 1/2004 | McCoy | A63B 53/04 | |
| | | | 709/246 | |
| 2004/0004938 A1* | 1/2004 | Buddhikot | H04L 45/12 | |
| | | | 370/238 | |
| 2004/0006613 A1 | 1/2004 | Lemieux et al. | | |
| 2004/0246975 A1* | 12/2004 | Joshi | H04L 45/02 | |
| | | | 370/395.31 | |
| 2004/0253948 A1* | 12/2004 | Laberteaux | H04W 84/00 | |
| | | | 455/422.1 | |
| 2005/0261062 A1* | 11/2005 | Lewin | A63F 13/12 | |
| | | | 463/42 | |
| 2006/0133337 A1* | 6/2006 | An | H04W 8/082 | |
| | | | 370/338 | |
| 2006/0187866 A1* | 8/2006 | Werb | G01D 4/004 | |
| | | | 370/311 | |
| 2006/0268727 A1* | 11/2006 | Rangarajan | H04L 45/00 | |
| | | | 370/248 | |
| 2007/0094325 A1* | 4/2007 | Ih | A63F 13/12 | |
| | | | 709/203 | |
| 2007/0127421 A1* | 6/2007 | D'Amico | H04W 72/005 | |
| | | | 370/338 | |
| 2007/0208737 A1* | 9/2007 | Li | H04L 67/26 | |
| 2008/0025230 A1* | 1/2008 | Patel | H04L 41/5022 | |
| | | | 370/252 | |
| 2008/0137591 A1* | 6/2008 | Hirano | H04L 63/18 | |
| | | | 370/328 | |
| 2008/0151746 A1* | 6/2008 | Vasseur | H04L 12/4633 | |
| | | | 370/228 | |
| 2008/0159271 A1* | 7/2008 | Kutt | H04L 12/66 | |
| | | | 370/352 | |
| 2008/0186873 A1* | 8/2008 | Pujet | H04L 12/5692 | |
| | | | 370/254 | |
| 2008/0201488 A1* | 8/2008 | Kenner | H04L 67/1008 | |
| | | | 709/245 | |
| 2009/0129316 A1* | 5/2009 | Ramanathan | H04L 45/123 | |
| | | | 370/328 | |
| 2009/0158362 A1* | 6/2009 | Kajos | H04N 7/17318 | |
| | | | 725/91 | |
| 2009/0172174 A1* | 7/2009 | Zha | H04L 12/2874 | |
| | | | 709/228 | |
| 2010/0016008 A1* | 1/2010 | Brewer | H04W 4/10 | |
| | | | 455/518 | |
| 2010/0091707 A1* | 4/2010 | Janneteau | H04W 8/082 | |
| | | | 370/328 | |
| 2010/0142373 A1* | 6/2010 | Jin | H04L 12/14 | |
| | | | 370/230 | |
| 2010/0142646 A1* | 6/2010 | Hensley | H04L 1/0026 | |
| | | | 375/316 | |
| 2010/0150028 A1* | 6/2010 | Campbell | H04L 12/2852 | |
| | | | 370/255 | |
| 2010/0211689 A1* | 8/2010 | Bijwaard | H04N 21/6405 | |
| | | | 709/228 | |
| 2010/0260192 A1* | 10/2010 | Hiie | H04L 45/00 | |
| | | | 370/400 | |
| 2010/0272062 A1* | 10/2010 | Velev | H04W 8/082 | |
| | | | 370/331 | |
| 2010/0278069 A1* | 11/2010 | Sharma | H04L 45/02 | |
| | | | 370/254 | |
| 2010/0315992 A1* | 12/2010 | Turanyi | H04W 8/082 | |
| | | | 370/315 | |
| 2010/0317284 A1* | 12/2010 | Charbit | H04B 7/2606 | |
| | | | 455/7 | |
| 2010/0325299 A1* | 12/2010 | Rao | H04L 1/1854 | |
| | | | 709/230 | |
| 2011/0153843 A1* | 6/2011 | Hsu | H04W 80/04 | |
| | | | 709/227 | |
| 2011/0289230 A1* | 11/2011 | Ueno | H04L 45/42 | |
| | | | 709/228 | |
| 2011/0320588 A1* | 12/2011 | Raleigh | H04W 36/245 | |
| | | | 709/224 | |
| 2012/0044949 A1* | 2/2012 | Velev | H04W 8/082 | |
| | | | 370/401 | |
| 2013/0051224 A1* | 2/2013 | Vasseur | H04L 12/4633 | |
| | | | 370/228 | |
| 2013/0103791 A1* | 4/2013 | Gottdenker | H04L 67/02 | |
| | | | 709/217 | |
| 2013/0159432 A1* | 6/2013 | Deering | G06Q 10/107 | |
| | | | 709/206 | |
| 2013/0166625 A1* | 6/2013 | Swaminathan | H04N 21/64738 | |
| | | | 709/203 | |
| 2014/0269333 A1* | 9/2014 | Boerjesson | H04L 45/123 | |
| | | | 370/238 | |
| 2014/0293787 A1* | 10/2014 | Bourdelles | H04W 40/248 | |
| | | | 370/235 | |

OTHER PUBLICATIONS

Dillon, Tharam, Chen Wu, and Elizabeth Chang. "Cloud computing: issues and challenges." Advanced Information Networking and Applications (AINA), 2010 24th IEEE International Conference on. Ieee, 2010. APA.*

Zäpfel, Günther, and Michael Wasner. "Planning and optimization of hub-and-spoke transportation networks of cooperative third-party logistics providers." International journal of production economics 78.2 (2002): 207-220.*

Fall, Kevin. "A delay-tolerant network architecture for challenged internets." Proceedings of the 2003 conference on Applications, technologies, architectures, and protocols for computer communications. ACM, 2003.*

Burger, Eric W., and Jan Seedorf. "Application-layer traffic optimization (ALTO) problem statement." (2009).; https://tools.ietf.org/html/rfc5693.*

Burger, Eric W., and Jan Seedorf. "Application-layer traffic optimization (ALTO) problem statement." (2009).; https://tools.ietf.ord/html/rfc5693.

Dillon, Tharam, Chen Wu, and Elizabeth Cheng. "Cloud computing: issues and challenges." Advanced Information Networking and Applications (AINA), 2010 24th IEEE International Conference on. Ieee, 2010. APA.

* cited by examiner

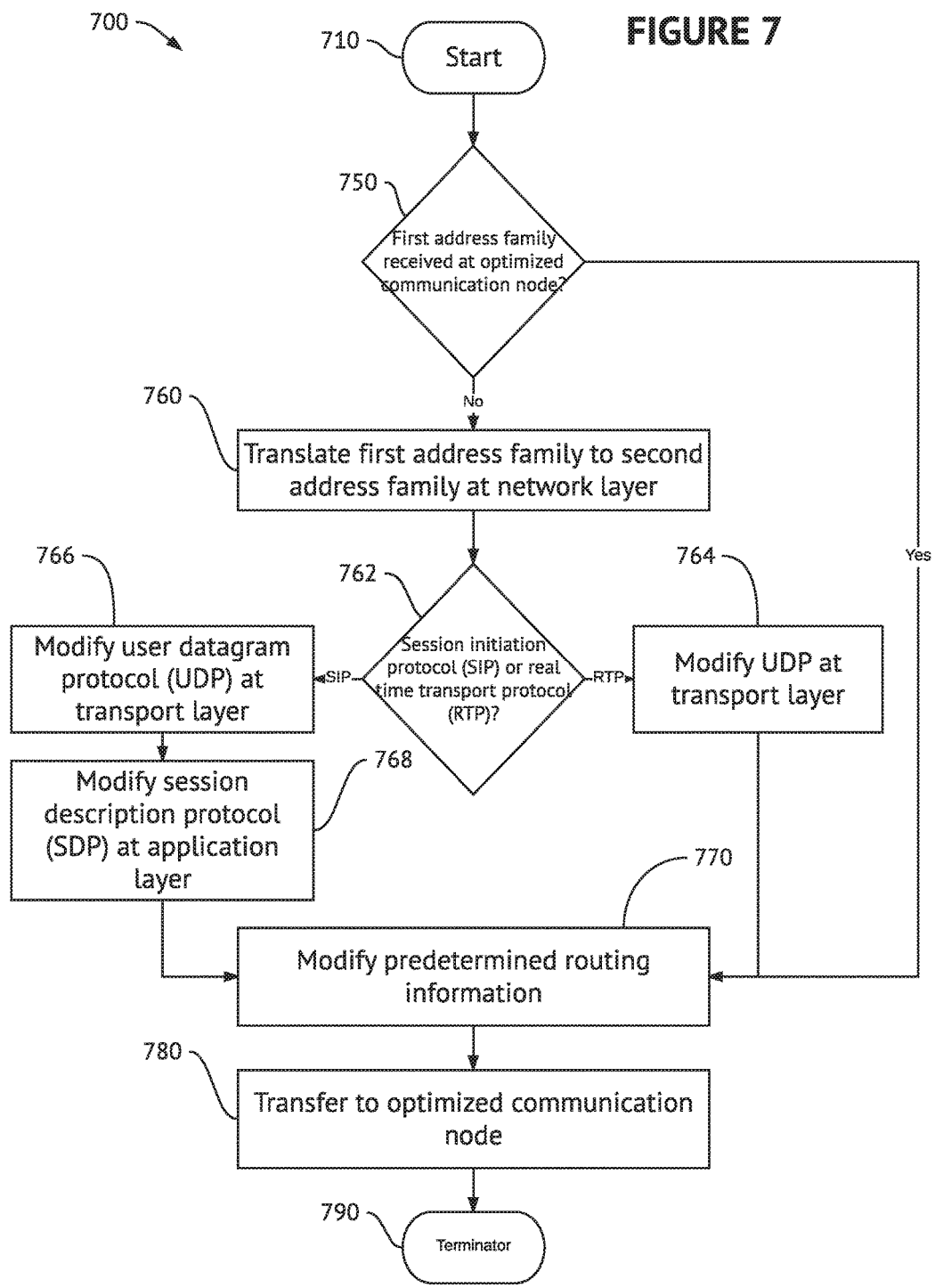

NETWORK ADDRESS FAMILY TRANSLATION METHOD AND SYSTEM

PRIORITY

This application is a continuation-in-part application of U.S. patent application Ser. No. 13/841,929 filed Mar. 15, 2013, titled "Systems and Methods for Optimizing Delivery Over Third Party Networks" and claims the benefit of and priority to such application under 35 U.S.C. § 120.

FIELD OF THE INVENTION

The present methods and systems relate generally to electronic communication systems, particularly to managing communication sessions end-to-end, from an originating source to a terminating destination, where the communication sessions involve delivery of application data (e.g., audio (voice) data, audio/video data, electronic file downloads, etc.) over one or more third party networks which have more than one address family.

BACKGROUND OF THE INVENTION

Communication nodes, more generally known as computing devices (e.g., servers, network switches, routers, and the like), which are connected either or both of a public and private network commonly are each assigned Internet Protocol (IP) addresses, to both locate and identify the nodes for communications with other nodes on that same network. Under the fourth and primary version of the Internet, known as "IPv4," the pool of unallocated IP addresses in the IPv4 address family is rapidly diminishing (due, in part, to factors such as poor planning; the ubiquity of Internet-capable devices, such as smartphones; and network expansion into developing countries, such as China and India). IP address depletion in the IPv4 address family has been anticipated since the late 1980s, and a successor protocol, Internet Protocol version 6 or "IPv6," has been developed and deployed as of 1993, which provides a larger address pool.

IPv4 and IPv6, however, are not designed to be interoperable, complicating the transition to IPv6 from IPv4. Many Internet service providers (ISPs) provide rudimentary solutions, including network address translation or "NAT" services, which generally includes remapping one IP address space into another. NAT services are also a popular method to allow private network address space (such as a business' internal network) to masquerade as one publicly routable IPv4 address at a single location (i.e., one router), instead of allocating a public address to each network device. When IP address information is modified at the packet level, however, the quality of Internet connectivity may suffer. NAT implementations by ISP vary widely and are not commonly documented by vendors of equipment containing the implementations. Many "un-IPv6-aware" NAT implementations often break native communications, as well as have other Quality of Service (QoS) issues. Therefore, a more reliable and cross-family operable methods and systems to send and receive communications sessions between communications nodes using both protocols over Internet provided by third-party ISPs are needed. Furthermore, a method and system to recognize and correctly interpret communications sessions sent and received over third-party Internet connections from a device hidden by a third party ISP-provided NAT implementation are also needed.

SUMMARY OF THE INVENTION

It is, therefore, an object of the present invention to provide methods for optimizing a communication session through at least one network comprising a series of communication nodes utilizing one or more address families. It is another object of the present invention to provide systems utilizing these methods.

The present invention may optionally operate within a number of communications and network environments, for example, but in no way limited to, the public Internet, a private Internet or Intranet, a data transport network or a series of networks, a communications network or series of networks, a non-optimized communications network or series of networks, an optimized communications network or series of networks, and the like.

One exemplary method of the present invention can comprise optimizing a communication session through at least one network, which can further comprise a series of communication nodes. In this exemplary method, the at least one network can utilize one or more address families.

In one aspect of the exemplary method, a communication node within the series of communication nodes can receive at least one session parameter indicating initiation of a communication session. This at least one session parameter can comprise any or all of the following: a first address family, predetermined routing information for routing the communication session through the series of communication nodes, a session criteria, and a session type.

In another aspect of the exemplary method, a communication node can retrieve a list of possible communication nodes, containing all possible communication nodes in the at least one network through which the communication session may be routed, from a local communication node. This list of possible communication nodes can be prioritized, at least in part, on any or all of the following: a session criteria of each of the possible communication nodes and a session type of each of the possible communication nodes.

In yet another aspect of the exemplary method, a communication node can identify, based on a set of business rules stored at the communication node, an optimized communication node from a list of possible communication nodes. This set of business rules can be used to analyze the list of possible communication nodes, at least in part, based on any or all of the following: predetermined routing information associated with a communication session, session criteria of this communication session, session criteria associated with each of the possible communication nodes, a session type of this communication session, and a session type or types associated with each of the possible communication nodes.

In still another aspect of the exemplary method, a communication node can determine if an optimized communication node receives communication sessions utilizing a first address family associated with a communication session or a second address family.

In an additional aspect of the exemplary method, a communication node can modify at least one abstraction layer of a communication session, based on a set of business rules, by modifying at least one implementation instruction for a set of functionality of the abstraction layer. This modification may allow transmission of the communication session from the communication node to an optimized communication node utilizing either of one of the first address family or the second address family.

In a last aspect of the exemplary method, a communication node can modify predetermined routing information of a communication session, based on either or both of session criteria of an optimized communication node and a session type of the optimized communication node. Thereafter, the communication node can transmit the communication session from the communication node to the optimized communication node.

The following are either or both additional and exemplary aspects of the present exemplary method, one or more of which can be combined with the basic inventive method as embodied above:

the communication node within the series of communication nodes can be at least one of an originating node, an intermediary node, and a destination node;

the first address family can comprise at least one of Internet protocol version 4 (IPv4) and Internet protocol version 6 (IPv6);

the second address family can comprise at least one of IPv4 and IPv6;

the first address family or second address family can comprise neither of IPv4 and IPv6, but some other address family type;

the list of possible communication nodes can be stored at the communication node;

the set of business rules can be determined at the communication node based on at least one of a network condition and a network event;

modifying the at least one implementation instruction for the set of functionality of the abstraction layer can comprise a translation at a network layer of a first address family Internet protocol (IP) address to a second address family IP address based on at least one of the set of business rules, a determination the optimized communication node utilizes the second address family, at least one transport layer protocol, and the at least one session parameter;

modifying the at least one implementation instruction for the set of functionality of the abstraction layer can comprise modifying at a transport layer a user datagram protocol (UDP) by a translation of at least one of a source service port and a destination service port based on at least one of the business rules, the session type of the communication, and at least one application layer protocol; and the at least one application layer protocol can comprise at least one of a real-time transport protocol (RTP) and a session initiation protocol (SIP).

modifying the at least one implementation instruction for the set of functionality of the abstraction layer can comprise modifying at an application layer a session description protocol (SDP) containing at least one of a communication session announcement, a communication session invitation, and a session parameter negotiation data, wherein the modification at the application layer can be based on at least one of the set of business rules, the session type of the communication session, a translation at a network layer, and a modification at a transport layer.

modification of the application layer can occur when the communication session at the application layer comprises at least one of an RTP and a SIP;

modification of the application layer can occur if the translation occurs at the network layer or the modification occurs at a transport layer; and modification of the application layer can occur if the translation occurs at the network layer and the modification occurs at the transport layer.

In another exemplary embodiment, a system for optimizing a communications session through at least one network comprising a series of communication nodes utilizing one or more address families is further contemplated. This exemplary system can comprise a local communication node database for storing a list of possible communication nodes within the network through which the communication session can be routed and a communication node operatively coupled to the local communication node database and comprising a hardware processor which can be operative to execute any or all, in any order and combination, the basic inventive concept as embodied in the above exemplary method and the additional and exemplary aspects as stated above.

Another exemplary method of the present invention can comprise optimizing a communication session through at least one network which can further comprise a series of communication nodes and network edge devices. In this exemplary method, the at least one network can utilize one or more address families.

In one aspect of the exemplary method, a network edge device within the series of communication nodes and network edge devices can receive at least one session indicating initiation of a communication session. This session parameter can comprise any or all of the following: a first address family, predetermined routing information for routing the communication session through the series of communication nodes and network edge devices, a session criteria, and a session type.

In another aspect of the exemplary method, a network edge device can retrieve a list of possible communication nodes and network edge devices, this list containing all possible communication nodes and all possible network edge devices in at least one network through which the communication session may be routed, from a local communication node database. This list of possible communication nodes and network edge devices can be prioritized, at least in part, on any or all of the following: session criteria associated with each of the possible communication nodes, session criteria associated with each of the possible network edge devices, a session type or types associated with each of the possible communication nodes, and a session type or types associated with each of the possible network edge devices.

In yet another aspect of the exemplary method, a network edge device can identify, based on a set of business rules stored at the network edge device, an optimized communication node or an optimized network edge device from a list of possible communication nodes and network edge devices. This set of business rules may be used to analyze the list of possible communication nodes and network edge devices, at least in part, based on any or all of the following: predetermined routing information associated with a communication session, session criteria associated with this communication session, session criteria associated with each of the possible communication nodes, session criteria associated with each of the possible network edge devices, a session type or types associated with the communication session, a session type or types associated with each of the possible communication nodes, and a session type or types associated with each of the possible network edge devices.

In still another aspect of the exemplary method, a network edge device can determine if an optimized communication node or an optimized network edge device receives communication sessions utilizing a first address family associated with a communication session or a second address family.

In yet still another aspect of the exemplary method, a network edge device can modify at least one abstraction layer of a communication session, based on a set of business rules, by modifying at least one implementation instruction for a set of functionality of abstraction layer. This modification can allow the network edge device to transmit the communication session to an optimized communication node or an optimized network edge device, where either of the optimized communication node or the optimized network edge device can utilize either of one of a first address family or a second address family.

In a last aspect of the exemplary method, a network edge device can modify predetermined routing information of a communication session based on any or all of the following: session criteria associated with an optimized communication node, a session type associated with the optimized communication node, session criteria associated with an optimized network edge device, and a session type associated with the optimized network edge device. Thereafter, the network edge device can transmit the communication session from the network edge device to the optimized communication node or the optimized network edge device.

The following are either or both additional and exemplary aspects of the present exemplary method, one or more of which can be combined with the basic inventive method as embodied above:
- the network edge device can be at least one of an originating node, an intermediary node, and a destination node;
- the network edge device can be operatively connected to one or more communication assets for enabling the communication through the at least one network with at least one other communication asset;
- the first address family can comprise at least one of IPv4 and IPv6;
- the second address family can comprise at least one of IPv4 and IPv6;
- the first address family or the second address family can comprise neither of IPv4 and IPv6, but some other address family type;
- the list of possible communication nodes and network edge devices can be stored at the network edge device;
- the set of business rules can be determined at the network edge device based on at least one of a network condition and a network event;
- modifying the at least one implementation instruction for the set of functionality of the abstraction layer can comprise a translation at a network layer of a first address family IP address to a second address family IP address based on at least one of the set of business rules, a determination the optimized communication node or the optimized network edge device utilizes the second address family, at least one transport layer protocol, and the at least one session parameter;
- modifying the at least one implementation instruction for the set of functionality of the abstraction layer can comprise modifying at a transport layer a UDP by a translation of at least one of a source service port and a destination service port based on at least one of the set of business rules, the session type of the communication session, and at least one application layer protocol; and
  - the at least one application layer protocol can comprise at least one of an RTP and a SIP.
- modifying the at least one implementation instruction for the set of functionality of the abstraction layer can comprise modifying at an application layer an SDP containing at least one of a communication session announcement, a communication session invitation, and a session parameter negotiation data, wherein the modification at the application layer can be based on at least one of the set of business rules, the session type of the communication session, and a translation at a network layer, and a modification at a transport layer.
  - modification of the application layer can occur when the communication session at the application layer comprises at least one of an RTP and a SIP;
  - modification of the application layer can occur if the translation occurs at the network layer or the modification occurs at a transport layer; and
  - modification of the application layer can occur if the translation occurs at the network layer and the modification occurs at the transport layer.

In another exemplary embodiment, a system for optimizing a communications session through at least one network comprising a series of communication nodes and network edge devices utilizing one or more address families is further contemplated. This exemplary system can comprise a local node database for storing a list of possible communication nodes and possible network edge devices within the network through which the communication session may be routed and a network edge device operatively coupled to the local communication node database and comprising a hardware processor which can be operative to execute any or all, in any order and combination, the basic inventive concept as embodied in the above exemplary method and the additional and exemplary aspects as stated above.

These and other exemplary aspects of the present basic inventive concept are described below. Those skilled in the art will recognize still other aspects of the present invention upon reading the included detailed description.

DETAILED DESCRIPTION OF THE DRAWINGS

The present invention is illustrated by way of example, and not limitation, in the figures depicted in the following drawings.

FIG. 7 illustrates one exemplary aspect of the present invention, an exemplary method for translating from a first address family to a second address family at an abstraction layer.

DETAILED DESCRIPTION OF THE INVENTION

Figure 1:
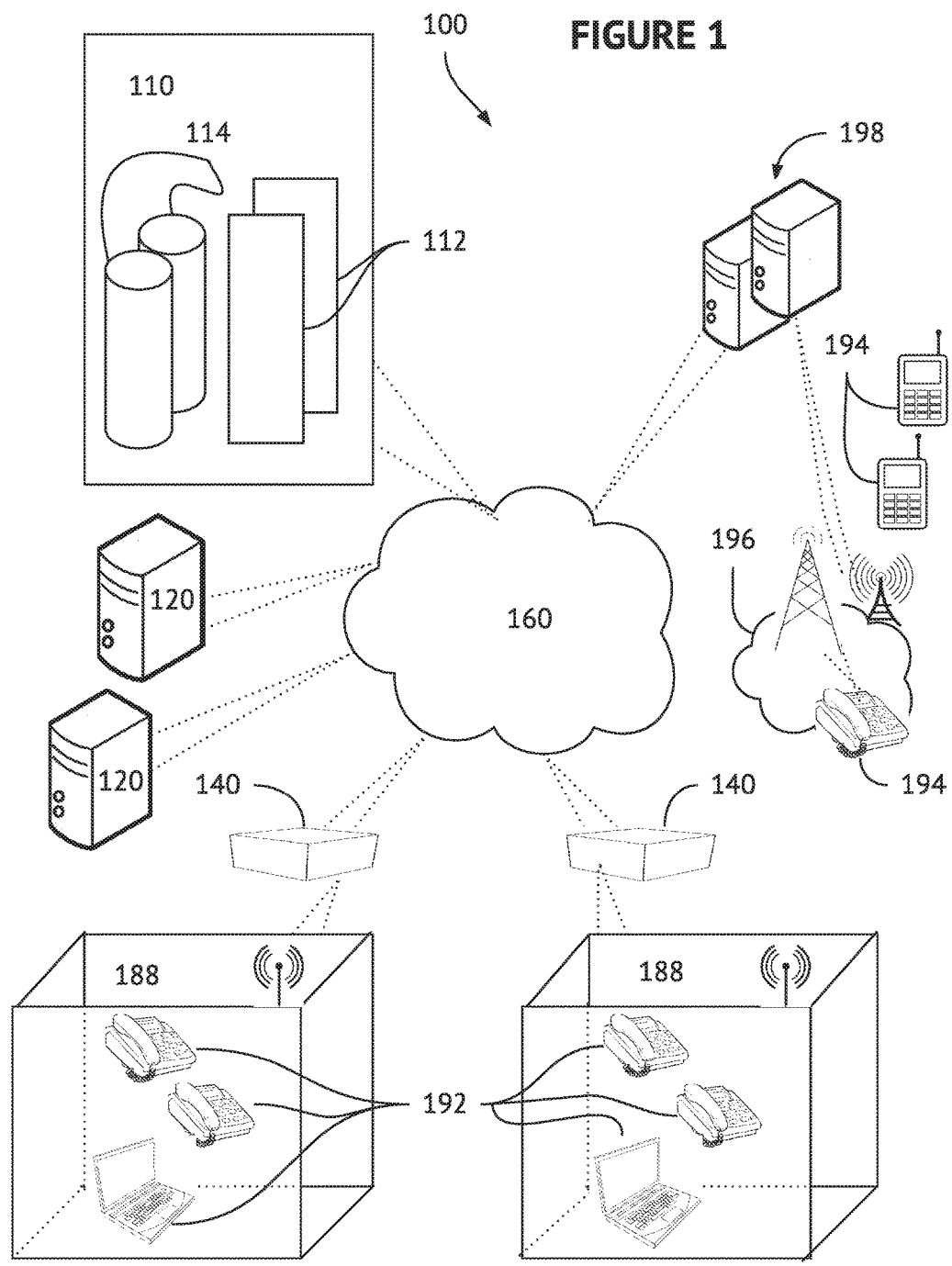
FIG. 1 illustrates by way of example a communications system environment within which the present invention may operate, known as a communication network.

The present invention will now be described more fully herein with reference to the accompanying drawings, which form a part of, and which show, by way of illustration, specific exemplary embodiments through which the invention may be practiced. This invention may, however, be embodied in many different forms and should not be construed as limited to the exemplary embodiments set forth below. Rather, these exemplary embodiments are provided so that this disclosure will be thorough and complete, and will fully convey the scope of the invention to those skilled in the art. Among other things, the present invention may be embodied as methods, systems, and devices. Accordingly, various exemplary embodiments may take the form of entirely hardware embodiments, entirely software embodiments and embodiments combining software and hardware aspects. The following detailed description, is, therefore, not to be taken in a limiting sense.

Throughout this specification and claims, the following terms take the meanings explicitly associated herein, unless the context clearly dictates otherwise. The phrase "in one embodiment" does not necessarily refer to the same embodiment, though it may. Furthermore, the phrase "in another embodiment" does not necessarily refer to a different embodiment, although it may. As described below, various embodiments of the invention may be readily combined, without departing from the scope or spirit of the invention.

In addition, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements or to delineate or otherwise narrow the scope. Its purpose is simply to present some concepts in a simplified form as a prelude to a more detailed description that is presented later.

The present invention, generally, is directed towards an Internet protocol (IP) address family translation system and method. Such application is directed towards providing the ability to send and receive communications sessions between communication nodes, network edge devices, and the like, using more than one Internet protocol. This application is especially advantageous where communication sessions need to be transferred from one location to a second using the public Internet, i.e., Internet access provided by third-party Internet service providers (ISPs). The present invention, also, provides a translation system and method which may allow a communication node or a network edge device to recognize and interpret communication sessions received over a third-party Internet connection from a device hidden by a third party ISP-provided NAT implementation.

Below, exemplary embodiments of these systems and methods will be provided in conjunction with the attached drawings. The written description below will begin with reference to FIG. 1 and will include a high-level, generalized description of a "communication network" in which the present invention can be practiced. FIGS. 2 through 7 thereafter will discuss various aspects of the present invention, in more detail.

FIG. 1 illustrates an embodiment of a communication network 100, which is an exemplary environment in which the present invention can be constructed and operated, in accordance, individually and in any order or combination, the various aspects of the present disclosure. Communication network 100 includes optimized communication system or "OCS" 110, communication nodes 120, network edge devices 140, and networks 160. Communication network 100, generally, involves the connection of the various elements and components described herein for the transmission of communication sessions via electronic transfer of data over one or more third party networks, which generally includes transfer through a series of communication nodes. A communication session generally comprises data packets (either or both signaling and data packets) passed through a communication protocol and generally relating to one or more of the following non-exhaustive application types: audio only; audio and video; audio and data; or any combination of audio, video, and data over a digital medium. One knowledgeable in the art should understand that the phrase "communication session" is generally synonymous with the term "connection." As such, it should be realized that one exemplary embodiment of communication network 100, including OCS 110, can include, but is not limited to, an Internet Protocol (IP)-based communication system architecture that provides one or more users with an end-to-end, fully managed and monitored system for transporting audio, video, and other data traffic over third party networks. For purposes of this specification and the claims, it should be understood that a stream of incoming and/or outgoing communication sessions may also be referred to as "application data traffic", "media traffic", "communication traffic", or simply "traffic", at various places in this disclosure.

As illustrated, communication network 100 comprises a plurality of components in addition to OCS 110, communication nodes 120, network edge devices 140, and networks 160, for example, facilities 188 which house one or more communication assets 192 (each individually an asset 192 or collectively assets 192) for providing communication sessions (i.e., both incoming and outgoing), associated with assets 192. Within this exemplary embodiment, communication sessions may be between the illustrated assets 192, and between assets 192 and one or more assets 194 (each individually an asset 194 or collectively assets 194), and assets not shown. It should be understood that a communication session between assets 192, 194, and assets not shown can be, for example, in a two-party manner, or can involve other assets (also not shown) in a multi-party manner, such as, in a multi-asset (i.e., multi-user) conference call. In this exemplary embodiment as shown in FIG. 1, communication sessions originating or terminating from assets 192 are managed and operated by OCS 110, whether or not assets 192 are geographically distributed across multiple facilities 188. However, in alternate embodiments, it is possible that OCS 110 handles communication sessions for both types of asset 192, 194. Also, it will be understood that in alternate embodiments the assets 194 are not limited by connection to a traditional switched telephone network or "PSTN," such as PSTN 196, as shown in FIG. 1. For example, in such embodiments, assets 194 can be connected directly (i.e., without PSTN 196) to an IP network, such as network 160.

In FIG. 1, two exemplary facilities 188 are shown. But it will be understood that this is for illustrative purposes only.

According to aspects of this disclosure, assets are not necessarily tied to facilities, no relation necessarily exists between various facilities (not shown), and facilities 188 can be located in different geographical locations. Communication sessions involving assets 192 located in such facilities 188 occur via one or more network(s) 160 and are typically associated with one or more of the following, by way of example and not limitation, a web-deployed service with client/service architecture, a cellular data network, a cloud-based system, secure networks, and gateways/firewalls that provide information security, and the like. Moreover, as will be understood and appreciated, various networking components (not shown in FIG. 1) such as routers, switches, hubs, and the like, are generally also involved in transmitting communication sessions.

Assets 192, 194 generally are defined as electrical or electronic equipment that is connected to an IT infrastructure and that enables or is related to electronic communications (e.g., communication sessions). For example and in no way in limitation, assets 192, 194 may comprise any singular or combination of a VoIP phone, a mobile phone, a fax machine, a conventional Plain Old Telephony System (POTS) phone, a smart phone, a cordless phone, a conference room speakerphone, a computer, a Bluetooth-enabled phone, a laptop, audio/video conferencing equipment, electronic gaming equipment, a printer, or more generally, any kind of computing device which can connect to a network and from which a user can operatively practice a communication function. Further, in locations such as facilities 188, analog overhead paging systems may be utilized. Such legacy systems (including existing communications circuits that transmit data at speeds around 1.544 megabits per second, also known as "Ti" circuits or POTS trunks) can be integrated with OCS 110 via adapters (not shown). As will be understood and appreciated, there is no limitation imposed on the number of assets, asset types, brands, vendors, and manufacturers, etc. that may be used in connection with embodiments of the present disclosure.

In a conventional communications network, an outgoing communication session will travel from asset 192 via one or more networks 160, through the IP-PSTN gateways 198 where IP traffic is converted into telephony traffic and is finally delivered to asset 194 or another asset (not shown). The reverse happens for an incoming communication session. As will be discussed in reference to this FIG. 1, additional configurations of communication traffic will be illustrated, for example, generated via assets (not shown), and passed from communication nodes 120 to networks 160. Additional embodiments contemplate communication traffic generated via assets 192 and passed from network edge devices 140 to networks 160. In one example, incoming traffic to facilities 188 may be directed to network edge devices 140 for eventual delivery to specific assets 192. In an alternative example, incoming traffic may be redirected to an automated attendant, call queues, voicemail, an off-premises device (e.g., a user's mobile phone or home phone).

According to one embodiment, and as shown in FIG. 1, OCS 110 may be connected to one or more communication nodes 120, network edge devices 140, and networks 160. Through these connections, as shown, OCS 110 can be operatively connected to one or more of the facilities 188, and in additional exemplary embodiments, one or more remotely-located OCS server modules 112 and OCS databases 114. Thus, assets 192 are managed and controlled by OCS 110 via OCS server modules 112, communication nodes 120 and network edge devices 140 via networks 160.

In contrast and for purposes of illustration only, assets 194 are intended to represent assets that are not managed and controlled by OCS 110. In one embodiment, OCS 110 monitors and collects real-time and historical network characteristics, applies business rules related to networks 160 characteristics, evaluates various communication session routes/paths, and if necessary modifies communication routes to account for the application of business rules and real-time networks 160 characteristics.

OCS server modules 112, as shown in FIG. 1, are intended to be any singular or collection of computer servers or communication nodes that provide a suite of hosted services to create a complete, feature-rich communication system. As such, OCS server modules 112 may comprise any combination of computing components, by way of example, but in no way required or limited to, processing units (CPUs), mass memory, buses, RAM, ROM, and other storage means (all of which are not shown for simplicity purposes). In this exemplary embodiment, mass memory may include an example of computer readable storage media for storing information such as computer-readable instructions, data structures, program modules or other data, basic input/output system ("BIOS") for controlling low-level operations of OCS server modules 112, as well as an operating system for controlling the operation of OCS server modules 112. It should be appreciated that these components may include a general-purpose operating system such as a version of UNIX or LINUX™. The operating system may include, or interface with, Java virtual machine modules that enable control of either or both hardware components and operating systems operations, via Java application programs.

As depicted in FIG. 1, OCS databases 114 are intended to be any singular or collection of computer servers or communication nodes for storing data associated with providing communication sessions. One embodiment of OCS databases 114 comprises a directory further comprising information identifying characteristics relating to various communication nodes. Non-limiting examples of such directory information include, but are not limited to, IP addresses of the respective communication nodes, a type of classification of such communication nodes, and a type of application data (audio/video/data) the respective communication node handles. OCS databases 114, in one example, may be relational, which can be defined as tabular databases with data defined so that it may be reorganized and accessed in a number of ways, and in another example distributed, which can be defined as dispersed or replicated databases located among different points in the network. These examples, however, are exemplary only and OCS database 114 can have any other configuration which is operably functional for OCS 110 or communication network 100.

In FIG. 1, as shown, communication nodes 120 are operatively connected to the OCS 110, OCS server modules 112 and OCS databases 114 via one or more networks 160, such as the Internet. In general, communication nodes 120 can be any type of IP-enabled device that connects to a network (such as networks 160) and enables communication sessions. As referred to throughout this specification and the claims, communication nodes 120 can be, but are not limited to, nodes that are "compliant" with OCS 110, which is a communication node either or both operated and managed, or capable of being controlled, managed, or manipulated by an embodiment of OCS 110, or nodes that are not compliant with OCS 110, which can be nodes which cannot be either or both operated and managed, or capable of being controlled, managed, or manipulated by an embodiment of OCS 110. Non-limiting examples of communication nodes 120 include network edge devices (such as network edge devices 140), provisioning servers, route servers, media proxy servers, statistics servers, and the like. In contrast, by way of example, communications nodes which are not compliant with OCS 110 include PSTN nodes, such as PTSN 196 and IP-PSTN gateway 198, which are ordinarily nodes that are maintained by third party ISPs, and the like.

According to an embodiment, communication nodes 120 receive information relating to a plurality of network elements (not shown for simplicity purposes) via OCS server modules 112 and OCS databases 114. In additional embodiments, communication nodes 120 can also receive business rules that dictate communication session optimization criteria. In further embodiments, the business rules that dictate communication session optimization may also be stored at the communication nodes. This aspect of the present invention will be discussed with reference to FIG. 3, below. In one embodiment, information in the OCS databases 114 is collected by components of the OCS server modules 112, and provided to communication nodes 120, network edge devices 140 or other nodes (not shown), with such information used at least in part for determining optimal communication session routes or paths in combination with business rules, as will be better understood from the discussions in connection with FIGS. 3 and 5.

In FIG. 1, as shown, network edge devices 140 are operatively connected to the OCS server modules 112 and OCS databases 114 via one or more networks 160, such as the Internet. In general, network edge devices 140 are one example of communication nodes 120. However, network edge devices 140 can also include, but not be limited to, general purpose computers, dedicated PBX servers, network-attached component devices, or other specific computing devices or servers that operate "OCS-compliant" applications and software. Network edge devices 140, in one example, generally include at least one operative connection to one or more assets 192. Network edge devices 140, additionally, can be generally identified with several attributes, for example, a device identifier, a device type, a network address, a location, and the like, which will be discussed in more detail below with reference to FIGS. 4 and 5.

In additional embodiments, network edge devices 140 can be self-contained, compact, energy-efficient communication nodes running proprietary software from flash memory or a Solid State Drive (SSD) that provide QoS (Quality of Service) guarantees to communication traffic associated with assets 192. In such embodiments, network edge devices 140 are generally responsible for collecting networks 160 measurements, including but not limited, packet loss, round trip times, transfer speed, jitter, and the like, and interact with applications running on assets 192 and associated IT Infrastructures. Generally, network edge devices 140 are operatively connected to OCS server modules 112 and OCS databases 114 to exchange optimal routing information on a periodic or continual basis.

According to one aspect, network edge devices 140 are generally used to gather information about the assets 192 and conditions of networks 160 in a periodic manner to assess characteristics of potential communication paths and other network conditions. It will be appreciated by one skilled in the art that because of the complex interconnections of a large number of networks with varying network characteristics and the way information is routed through network elements, as is illustrated in one example according to a "guarantee-less paradigm" of Internet protocol generally, the quality of communication sessions occurring via networks 160 is generally unpredictable and unreliable. For example, some nodes, one exemplary representation being communication nodes 120 and network edge devices 140, may be down or damaged, some nodes may have faster computational capabilities over other nodes, some nodes encounter more network congestion than other nodes and the like. OCS 110, as presently disclosed may, among other things, be used to monitor the quality of networks 160 to provide reliable and optimized communication sessions between assets, for example, assets 192, 194.

It will be further understood that the terms "networks," "at least one network," or "networks 160" as used herein generally include any kind of computer-enabled, IP-enabled, or other digital network for transporting traffic associated with communication sessions, and generally include a network is a system of interconnected computing devices, nodes, and/or assets. In one example, a network includes the Internet that is a global system of interconnected computers that use the standard Internet protocol suite to serve users worldwide with an extensive range of information resources and services. It should also be understood that the term "Internet" as used herein and generally, in reality, is a network of networks consisting of millions of private, public, academic, business, and government networks, of local to global scope, that is linked by a broad array of electronic, wireless and optical technologies. As described in reference to this specification and the claims, communication nodes and network edge devices generally connect to networks, and networks may comprise one or more communication nodes and network edge devices as illustrated in these exemplary embodiments, for example, communication nodes 120, network edge devices 140, and networks 160.

Usually, such networks are offered as commoditized services by third-party Internet service providers (ISPs) and include a plurality of one or more third party sub-networks that are usually owned by third party network providers or third party carriers. Such sub-networks can be hard-wired or wireless, including but not limited to, cellular, optical fiber, Wi-Fi, WiMax, proprietary networks, and the like, as should occur to one skilled in the art. It should also be understood by one skilled in the art that networks 160 can further include PSTN nodes such as IP-PSTN gateways 198 at the boundary of IP networks, and PSTN 196 for conversions between PSTN traffic and IP traffic.

As will be described in greater detail herein, it will be understood that further embodiments as discussed herein provide the functionality of determining and enabling optimal communication session routes for incoming and outgoing communication sessions associated with various applications (e.g., voice-based applications, video-based applications, multimedia-based applications, file download applications, email applications, etc.). Such communication session routes/paths may comprise a plurality of either or both intermediary and forwarder nodes via networks 160. For purposes of this specification and as used throughout this specification and the claims, it should be noted that the communication node may optionally be an originating node, one from which a communication session is initiated, an intermediary node, one which is along the path (i.e., route) which the communication session is routed (e.g., neither an originating or destination node), or a destination node, one at which a communication session terminates.

Once an optimal communication session route is established (with or without intermediary nodes), data associated with the respective communication session is routed along this optimal route from the originating node or source node to the destination node or terminating node. It should be understood and appreciated that the intermediate nodes can be compliant with OCS 110 or nodes that are maintained or operated by third party communication providers, such as PSTN nodes 196, 198.

Figure 2:
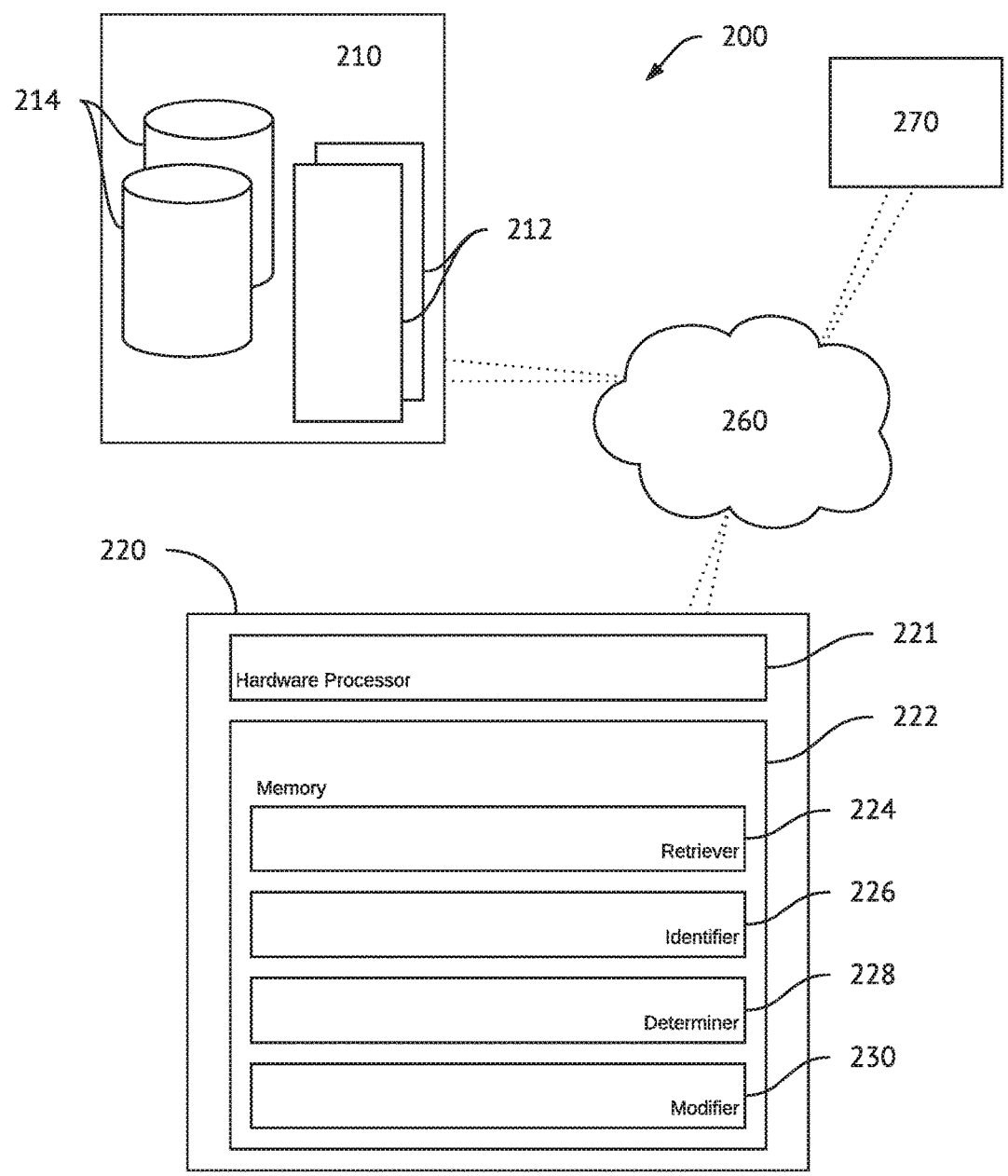
FIG. 2 illustrates one exemplary embodiment of the present invention, a system for optimizing a communications session through a network comprising a series of communication nodes, utilizing one or more address families.

FIG. 2 illustrates one exemplary aspect of communication network 100, as illustrated above with reference to FIG. 1, a system 200 for optimizing communication sessions through a network comprising a series of communication nodes, utilizing one or more address families.

As illustrated, system 200 comprises a plurality of components, including OCS 210, communication node 220, network 260, and optimized communication node 270. For simplicity of illustration, this exemplary embodiment does not depict other network and system components, such as network edge device(s), IP-PSTN gateway(s), PSTN(s), facilities or assets, however, each, all or any combination thereof of these components are contemplated for use as part of or in conjunction with system 200. In this exemplary embodiment, communication sessions may be initiated, terminated or otherwise transmitted through system 200 in the same or similar manner as described with reference to FIG. 1.

In one embodiment as illustrated in FIG. 2, OCS 210 monitors and collects real-time and historical network characteristics, applies business rules related to networks 260 characteristics, evaluates various communication session routes/paths, and if necessary modifies communication routes to account for the application of business rules and real-time networks 260 characteristics. Likewise, OCS server modules 212 are intended to be the same or similar to OCS server modules 112 as described and illustrated in more detail with reference to FIG. 1.

OCS databases 214, which may also be described as "communication node databases" or "local communication node databases" (both of which, for the purposes of this specification and the claims, are synonymous with OCS databases 214), as illustrated in this exemplary embodiment, are contemplated to be any singular or collection of computer servers or communication nodes for storing data associated with providing communication sessions. OCS databases 214, in one example, may be relational or distributed, depending on the searching, organization, and modification requirements of administrator(s) or users. Further embodiments contemplate OCS databases 214 having content or structure as required by system 200, or in yet still additional embodiments, determined at the option of, based on a set of predetermined or dynamic business rules, system 200. These examples, however, are exemplary only and OCS databases 214 can have any configuration which is functionally necessary for OCS 210 or system 200 to operate.

In one exemplary aspect of the present embodiment, as illustrated in FIG. 2, OCS databases 214 can be locally accessible by other system 200 components (shown and not shown) and can store a directory or list of all possible communication nodes in networks 260, and, in additional embodiments, all possible communication nodes in other networks (not shown) through which a communication session may be routed. OCS databases 214, for example, store information needed by OCS 210, such as, for example, list, directory or other databases comprising information identifying communication nodes that are either or both known and capable of being either or both controlled and managed by OCS 210. In one embodiment, communication nodes, such as communication node 220 and other communication nodes (not shown), can include originating nodes or source nodes, intermediary nodes, destination nodes or terminating nodes, as well as nodes that are potential "next-hop" relays.

In one exemplary embodiment, OCS database 214 provides a "picture" of the geography and routing infrastructure of network 260, all or any of which can be operated and maintained by a plurality of third party service providers and carriers. In one embodiment, such a picture is evaluated on the basis of metrics such as pathway or connection quality, round trip times, jitter, packet loss rate, bandwidth, geographical location of communication nodes, and other metrics which are functionally necessary for system administrators or users to communicate within system 200. According to one exemplary embodiment, OCS databases 214 can be maintained and updated in a periodic manner by OCS server modules 212, by way of example, and not of limitation, by a provisioning server, a routing server, a statistics server, a network sampling server (all not shown individually, except as is intrinsic in the structure of OCS modules 212), and the like. As should occur to one of ordinary skill in the art, "periodic" can be every hour, minute, virtually continuously, or the like. It is contemplated that information contained in OCS databases 214 is shared with communication node 220, other communication nodes (not shown), and OCS server modules 212, any or all of which may require the information. In this and other exemplary embodiments, such information can be used for determining optimal or optimized communication session routes in combination with business rules, as will be better understood from the discussion below.

As further illustrated in FIG. 2, OCS databases 214 are operatively coupled to communication node 220. Furthermore, communication node 220 comprises a hardware processor 221 which is operative to execute computer readable instructions stored in a memory 222. Additional elements, software(s), application(s), hardware, peripherals and structural components are further contemplated to be required for the functional enablement of communication node 220, however, such elements software(s), application(s), hardware, peripherals and structural components are not illustrated (for simplicity purposes only). Such elements, software(s), application(s), hardware, peripherals and structural components may include but are not limited to, ports, buses, other input/output interfaces, displays, general use applications, operating system(s), and the like, or any such elements and structural components which are functionally necessary to adequately enable operation of communication node 220.

Hardware processor 221 can be generally defined as the central processing unit (CPU) of communication node 220, or the electronic circuitry within communication node 220 (or any other computing device) that carries out the computer-executable instructions stored in memory 222, by performing basic operational functions, including but not limited to, for example, the basic arithmetic, logic, control and input/output (I/O) operations (if any) specified by the instructions.

Memory 222, as depicted in FIG. 2, may further comprise location(s) for operational components, application(s), software(s) and other computer executable instructions (any or all of which, as discussed above, are generally accessed from memory 222 by hardware processor 221). Memory 222 can generally be defined as the computing hardware device or devices used to store information for immediate use in a computing device; such as communication node 220, and is commonly synonymous with the term "primary storage" or the descriptive term "storage." Memory 222, for example, operates at various speeds, such as in one example, random-access memory (RAM) which operates at a high speed, whereas other storage methods provide slow-to-access program and data storage but offer higher storage capacities. Other non-limiting examples of memory include non-volatile memory such as, flash memory, read-only memory (ROM), programmable read-only memory (PROM), erasable programmable read-only memory (EPROM), electrically erasable programmable read-only memory (EEPROM), and the like, and volatile memory such as dynamic random-access memory (DRAM), static random-access memory (SRAM), other CPU cache memory, and the like. Other types of memory can also include but are not limited to, secondary storage devices such as hard disk drives and solid-state drives, which may be wired to or wirelessly coupled to a communication node 220.

Memory 222, as illustrated, may also comprise retriever 224, identifier 226, determiner 228, and modifier 230. Memory 222 may further comprise additional operational elements not stated or illustrated as part of this specification, however, memory 222 is contemplated to act as a storage location for all functionally necessary elements which require storage when such functionally necessary elements are necessary for the functional enablement of communication node 220. Hardware processor 221 can access retriever 224, identifier 226, determiner 228, and modifier 230, each individually, one at a time, in any combination of grouping(s), and simultaneously, or in any other order or grouping as is functionally necessary to execute operations as dictated by other system 200 components, for example, such as OCS 210 or networks 260.

Communication session(s) can be initiated at communication node 220, by the communication node 220 receiving one or more, but at least one, session parameter which includes an indication of initiation for the communication session. In this exemplary instance, session parameter(s) may include, but are not limited to, a first address family, predetermined routing information for routing a communication session through a series of communication nodes, a session criteria, and a session type. Communication session initiation and session parameters at a communication node 220 will be discussed in more detail with reference to FIG. 3, below.

In one embodiment, as illustrated in FIG. 2, hardware processor 221 accesses memory 222 to operably execute computing instructions embodied as retriever 224. Retriever 224 allows communication node 220 to actively retrieve from OCS databases 214 a list of possible communication nodes containing all possible communication nodes in or operatively connected to networks 260, through which the communication session can be routed. In this exemplary embodiment, the list of possible communication nodes can be prioritized, at least in part, on a session criteria of each of the possible communication nodes and a session type of each of the possible communication nodes. Session criteria and session type(s) for the possible communication nodes will be discussed in more detail with reference to FIG. 3, below.

In one embodiment, the list of possible communication nodes can represent either or both potential and preferred "next-hop" nodes for a variety of session types. Additional embodiments are contemplated where the list of possible communication nodes can be generated based on evaluation of the outcome of the evaluation utilizing the set of business rules, "real-time" network 260 conditions, other communication node outage(s), and the like. Therefore, it should be appreciated that a list of possible communication nodes can be overruled, or otherwise modified based on several factors.

In further embodiments, updates, review, evaluation, and modification of the list of possible communication nodes can occur both periodically and frequently. Specifically, possible communication nodes can be prioritized every minute, every ten minutes, every hour, or the like. Other embodiments contemplate processing requirements and computational efficiency, where updates, review, evaluation, and modification only occurs once per day or week, and the like. In yet still other embodiments, updates, review, evaluation, and modification may occur virtually continuously.

Examples of information that can be maintained for each possible communication node includes, but is not limited to, IP addresses of the respective communication nodes, types of classifications of such nodes, and type(s) of application data (e.g., audio, video, data, or any combination thereof) each respective communication node handles. Generally, information collection or classification (or "class" or "forking class") of communication nodes is a way of associating a predefined "communication-related feature," such as, for example and in no way limited to, voice mail, interactive voice response (IVR), conference calling, and other such features with one or more servers, such as a voice mail server, an IVR server, a conference server, and the like. In one embodiment, classification can be predefined by system users and/or system administrators (as defined below). In other embodiments, classification can be based on the computing capabilities of the possible communication nodes, the number of communication nodes for a given class that, in one example, are already pre-existing in a given geographical area, and so on. In yet other embodiments, classification can be based on having the same number of communication nodes in every information category.

Additional embodiments are further contemplated where the list of possible communication nodes is stored at the communication node.

As illustrated in FIG. 2, hardware processor 221 can access memory 222 to operably execute computing instructions embodied as identifier 226. In this exemplary embodiment, identifier 226 allows communication node 220 to actively identify an optimized communication node 270 from the list of possible communication nodes. Identifier 226, as part of the identification process, utilizes a set of business rules received to or stored at communication node 220 to analyze the list of possible communication nodes. This analysis or identification using the set of business rules can involve, but is not required to involve, a comparison (one or more comparisons, but at least one, for functional enablement of the present embodiment) involving any combination of the following information: the predetermined routing information of the communication session, a session criteria of the communication session, a session criteria associated with each of the possible communication nodes, a session type of the communication session, and a session type associated with each of possible communication nodes. The method of identification, analysis, comparison, and the like, occurring at communication node 220 involving each of the elements above, as well as descriptions of each said elements, will be detailed below with reference to FIG. 3, below.

Optimized communication node 270, as illustrated in FIG. 2, is a communication node having the same or similar elements, software(s), application(s), hardware, peripherals and structural components as communication node 220, and may include but is not required to include, hardware processors, memories, ports, buses, other input/output interfaces, displays, general use applications, operating system(s), and the like, or any such elements and structural components which are functionally necessary to adequately enable operation of either or both communication node 220 and optimized communication node 270. Additional embodiments are further contemplated where optimized communication node 270 is also communication node 220, in the event that these exemplary communication nodes 220, 270 are each "virtual" elements of the same computing device.

Figure 4:
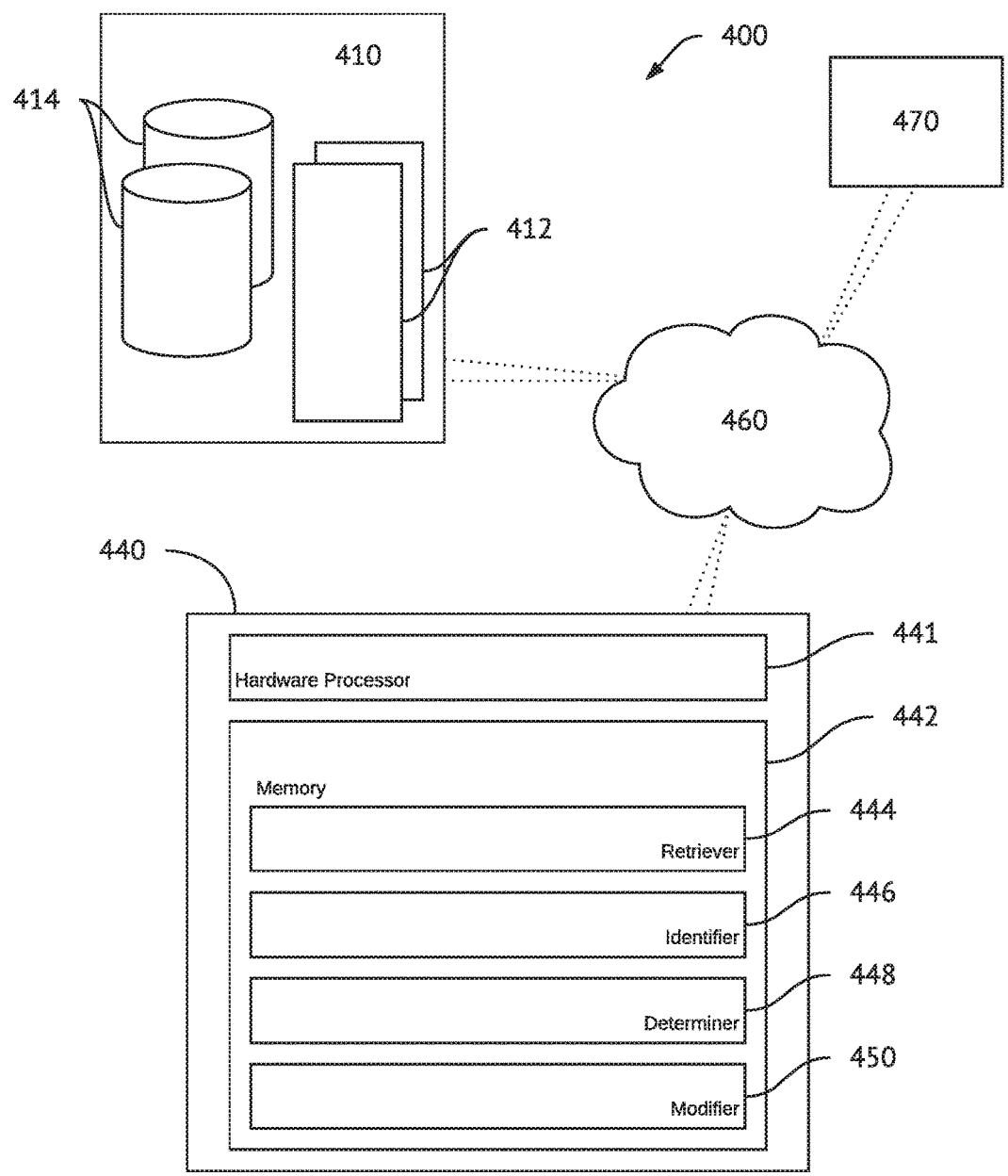
FIG. 4 illustrates one exemplary embodiment of the present invention, a system for optimizing a communications session through at least one network comprising a series of communication nodes and network edge devices utilizing one or more address families.

Yet still further embodiments are contemplated where optimized communication node 270 is a network edge device, such as, for example, network edge devices 140, 440, as illustrated in FIGS. 1 and 4, or any combination of a series of connected network edge devices, in which, in this exemplary instance, network edge devices 140, 440 may be one or more devices. Yet still additional embodiments are contemplated where optimized communication node 270 is a network edge device, such as network edge devices 140, 440, which is also communication nodes 220, 270 in the event that these exemplary communication nodes are each "virtual" elements of the same computing device.

Generally, business rules can be defined as policies and criteria that govern various aspects of communication sessions. Examples of such criteria include but are not limited to an Internet bandwidth requirement, a maximum tolerable packet loss rate, one or more allowable applications, a number of active assets and other devices (not shown) simultaneously engaged in communication sessions at a destination location or operably connected to a communication nodes, a maximum tolerable delay in voice data transfers, a maximum tolerable jitter, a minimum video frame rate, allowable geographical locations of intermediate nodes, and the like. Business rules, as illustrated by exemplary embodiments herein, are commonly defined by users within a system, for example, communication network 100 (shown in FIG. 1) and system 200, or system administrators. A "system user" can primarily be defined as a person who operates a computing device or a network service, such a computing system, software product, or the like. This term is often synonymous with "end user," and is distinguished from developers of a system (who enhance the system or software) as those who only use the system or software. A "system administrator," on the other hand can primarily be defined as a person who is responsible for the upkeep, configuration and operation of a computing system, including database systems, such as OCS databases 214, and general servers, such as OCS server modules 212. A system administrator may also maintain network infrastructure, such as switches and routers, as well as web server services that allow for internal and external access to websites associated with a system or network, such as, for example, communication network 100, system 200, and the like.

Additional embodiments are contemplated where the set of business rules stored at communication node 220 is determined at the communication node based on any number of outside factors, including but not limited to networks 260 condition(s) and networks 260 event(s). A "network condition" is often time synonymous with the term "communication session criteria" or "session criteria," which will be described in more detail with reference to FIG. 3. A "network event," such as a networks 260 event, can primarily be defined as an occurrence that warrants modification of an otherwise functional communication session path for a given communication session. Examples of network events include, but are not limited to, power outages, node failures, communication tower failures or damage, natural disasters impacting nodes or groups of nodes, routine or unscheduled maintenance associated with nodes, terrorist attacks, and virtually any other event or occurrence affecting an otherwise optimized communication node, such as optimized communication node 270, or route.

As described with reference to the exemplary embodiment illustrated by FIG. 2, business rules are typically stored at communication node 220, in a location at least in part, defined as memory 222, and can be functionally practicable with any one or more, in any combination, order, or organization, with any elements contained in memory 222, for example, identifier 226, determiner 228, and modifier 230. Additional embodiments contemplate the business rules being stored at a wired or wirelessly connected, remote location, such as, for example, a cloud storage or remote server (not shown) operably coupled to communication node 220.

Hardware processor 221 in FIG. 2 can also access memory 222 to operably execute computing instructions embodied as determiner 228. In this exemplary embodiment, determiner 228 allows communication node 220 to actively determine, based on the set of business rules either or both received to or stored at communication node 220, if the identified optimized communication node 270 receives communication sessions utilizing the communication session address family included as part of the session parameters, or a second address family. When and how analysis and determination of address family occur at communication node 220 will be discussed in more detail with reference to FIG. 3, below.

An "address family," "address type," or "Internet protocol address (IP address)" is ordinarily a numerical label assigned to any computing device, for example, and in no way limited to, OCS 210, OCS server modules 212, OCS databases 214, and communication node 220, which participates by being operatively connected to a network, such as, in one exemplary embodiment, networks 260. An IP address serves two primary functions, first, as "host" or "network interface" identification and, second, as location addressing. Namely, the IP address indicates where a computing device is located within a network. There is more than one address families or address types, for example, Internet protocol version 4 (IPv4), Internet protocol version 6 (IPv6), or any other contemplated address families or address types. As used in this specification and the attached claims, the terms "IPv4," "IPv6," "other address family," or "another address family" can each be used synonymously with "first address family" and "second address family," as the context dictates.

IPv4 is chiefly defined as the fourth version of the Internet Protocol (IP) and is one of the core protocols of standards-based internetworking methods on the Internet. IPv4 still routes most Internet traffic today, despite the ongoing deployment of a successor protocol, IPv6. IPv4, generally, is a connectionless protocol for use on packet-switched networks, such as, for example in the exemplary embodiment as illustrated in FIG. 2, networks 260. IPv4 approximately operates on a "best effort" delivery model, in that it does not guarantee delivery, nor does it assure proper sequencing or avoidance of duplicate delivery. IPv4 provides for only $23^2$ (4,294,967,296) addresses.

As should be apparent to one skilled in the art, every computing device operatively coupled to a network, for example, computers, routers, switches, communication nodes, and the like, are assigned an IP address that is used to locate and identify the device, especially when it is "in communication" with other devices on the network. If a device has several network interfaces, then each interface will have at least one distinct IP address assigned to it. For example, a laptop might have a wireless network interface and a wired network interface using a network cable, and this would require a total of two IP addresses. Furthermore, it is also possible that an interface can be assigned more than one IP address, for various reasons. The IPv4 addressing structure provides an insufficient number of publicly routable addresses to provide a distinct address to every Internet device or service.

IPv6, on the other hand, is the most recent version of the Internet protocol developed to deal with the long-anticipated problem of IPv4 address exhaustion. IPv6 is intended to replace IPv4, as it uses a 128-bit address, theoretically allowing $2^{128}$, or approximately 3.4×1038 addresses. The total number of possible IPv6 addresses is more than 7.9× 1028 times as many as IPv4 (which uses 32-bit addresses).

Further embodiments are contemplated to address either or both of a first address family or a second address family being neither of IPv4 nor IPv6, but either or both some other or another address family.

FIG. 2 further illustrates modifier 230, which hardware processor 221 can access memory 222 to operably connect to. Modifier 230 can have a two-fold functionality of modifying one or more, but at least one, of a communication session's abstraction layers and modifying a communication session's predetermined routing information. Modifier 230, in such embodiments as exemplified in FIG. 2, can modify either or both of an abstraction layer and predetermined routing information based on any of the following individually or in conjunction with one another, by way of example and in no way limited to: the predetermined routing information, the session parameters of the communication session, the set of business rules, a session criteria of optimized communication node 270, and a session type of optimized communication node 270. When and how analysis and modification occur at communication node 220 will be discussed in more detail with reference to FIGS. 3 and 7, below.

Figure 3:
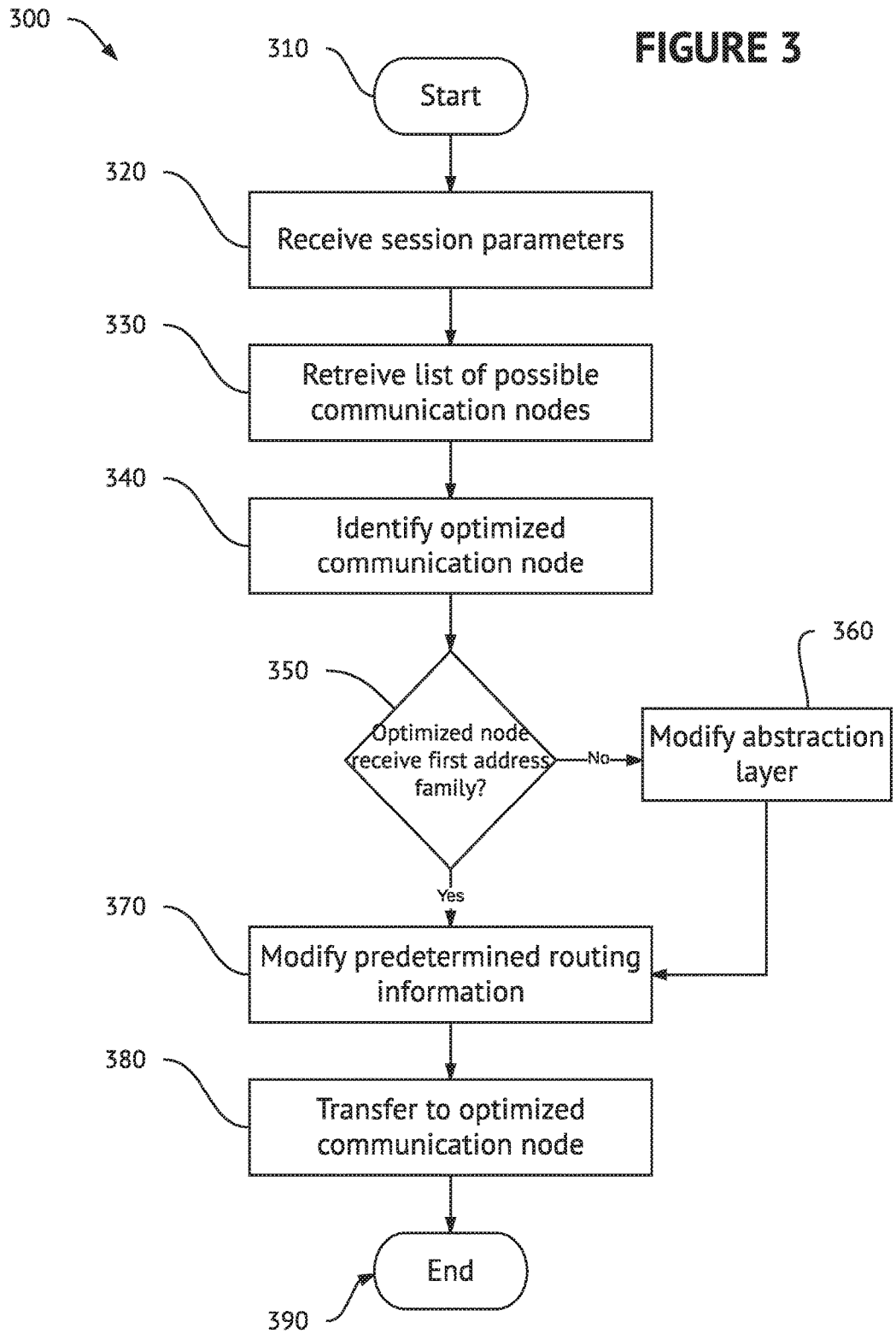
FIG. 3 illustrates one exemplary embodiment of the present invention, a method for optimizing a communication session through a network comprising a series of communication nodes, utilizing one or more address families.

The operation of certain aspects of the inventive concept as illustrated in the exemplary embodiment depicted in FIG. 2 will now be described with respect to FIG. 3. FIG. 3, as described below, illustrates a logical flow diagram generally showing one embodiment of a process or method for optimizing a communication session through at least one network comprising a series of communication nodes which utilizes one or more address families via, for example, the devices and systems described above in reference to FIGS. 1 and 2. Method 300 of FIG. 3 can be implemented in part, or whole, within network communication node 220 of FIG. 2, or in additional embodiments, as will be detailed below in FIGS. 4 and 5, such as, for example, network edge device 440. Furthermore, it is contemplated that steps can be either or both added and removed from method 300. The following detailed description is, therefore, not to be taken in a limiting sense, and various embodiments envisioned by either or both adding and removing steps in the process may be readily combined, without departing from the scope or spirit of the invention.

As contemplated by this exemplary method 300, the one or more address families may be defined, for example, as the Internet protocol or "IP" location descriptors which provide for the network transportation of application data from one computing device to another via a network. As discussed above with reference to FIG. 2, the one or more address families can be, for example, IPv4, IPv6, or another address family. Definitions may further include, for example, those stated above. In this particular context, the one or more address families specify the transport provider of a specific protocol. Also in this context, each of the communication nodes, within the series of communication nodes that comprise the network(s), is known as a host and has a unique address, from the one or more address families, called its "IP address."

As illustrated in FIG. 3, method 300 starts at 310. Thereafter, at 320 a communication node, which may be independent or within a series of communication nodes, receives at least one session parameter indicating initiation of a communication session. As illustrated in this exemplary method 300, the at least one session parameter received by the communication node at 320 may comprise each individually, or any combination of the following features: a first address family; predetermined routing information for routing the communication session through the series of communication nodes; a session criteria; and a session type.

A session parameter, as used throughout this specification and the claims, can generally be defined as information pertaining to and defining a specific communication session. By way of example and in not in limitation, session criteria can also comprise any or all of the following: a destination node for the communication session; a communication session type; an originating asset of a communication session; session criteria corresponding to or preferable for a specific communication session; and the like.

Also in the context of this exemplary embodiment, as well as used throughout this specification and the claims, the predetermined routing information can primarily be defined as a routing information protocol (RIP), which, in generalized terms, is a dynamic protocol used to find the best route or path from end-to-end (e.g., originating node to destination node) for a communication session over a network, for example, networks 160, 260, 460, by using a routing metric or a "hop count" algorithm. In this exemplary embodiment, the routing metric or hop count algorithm can be used, in one example, to determine the shortest path from the originating node to the destination node, which allows the communication session to be delivered in the shortest time.

Likewise, session criteria can be generally defined as one or more, but at a minimum, at least one, rule or principle for evaluating a network, such as, for example, networks 160, 260, 460. As embodied herein, the rules and principles can be interpreted as network conditions or other characteristics that are used as factors for determining "criteria" to optimize individual communication sessions or classes of communication sessions through the various network routes available. Examples of session criteria can include, but are not limited to, bandwidth requirements, a maximum tolerable packet loss rate, one or more allowable applications, number of active on-premises devices simultaneously engaged in communication sessions, a maximum tolerable delay in voice data, a maximum tolerable jitter, a minimum video frame rate, allowable geographical locations of intermediate nodes, and the like. Generally, it is contemplated that session criteria can have an impact (i.e., require modifications or revisions to) on business rules, and vice versa.

Also as used throughout this specification and the claims, a session type can conventionally be defined as a predetermined class or categorization of a communication session. Examples of communication session types include, but are not limited to, voice-based sessions, video-based sessions, multimedia-based sessions, file download sessions, email sessions, and the like.

Once a session parameter initiating a communication session is received at a communication node at step 320, the communication node can thereafter retrieve a list of possible communication nodes from a local communication node database at 330. The local communication node database, in this exemplary embodiment, may have the same or similar attributes as described with reference to OCS databases 114, 214, as attributed in more detail in FIGS. 1 and 2. The list of possible communication nodes may contain, in one exemplary embodiment, all possible communication nodes within a network through which the communication session may be routed. In one exemplary embodiment, the list of possible communication nodes may contain, for example, all communication nodes within a certain geographical distance, and in one specific example, "next-hop" communication nodes. Further exemplary embodiments contemplate the list of possible communication nodes to include inclusive catalog(s) of communication nodes, such as, for example, all communication nodes which meet certain session criteria, all communication nodes which accept a certain communication session type, all communication nodes within all available networks, such as, for example, networks 160, 260, 460, and other networks, and the like. Further embodiments contemplate this list being dynamically modified, either or both at the local communication node database and at the communication node, based on any number of limiting characteristics, by way of example and not in limitation, session parameter or a combination of session parameters of a given communication session (as such required by the predetermined routing information), a communication session type, an address family, and the like.

The list of possible communication nodes can be, for example, generated in light of various other factors, such as but not limited to, real-time network conditions, various communication node outage(s), and the like. Therefore, it will be appreciated that a predetermined list of possible communication nodes can be overruled, or otherwise modified based on several factors. In addition, it should be understood that the process described in connection with FIG. 3 can occur periodically and frequently. Specifically, the process by which communication pathways or routes and corresponding communication nodes can be prioritized can operate every minute, every ten minutes, every hour, or the like. In some embodiments, for the sake of processing requirements and computational efficiency, method 300 may only be performed once per day or week, or other extended time periods. In other embodiments, method 300 may occur virtually continuously. It should be even further appreciated that this methodology of generating a prioritized list of possible communication nodes helps eliminate communication session routes that have been impacted by communication failures communication tower problems due to disaster, natural calamities, routine maintenance, or some other unpredictable reason.

At 330, it is further contemplated that the list of possible communication nodes can be prioritized based on attributes of the possible communication nodes contained in the list. For example, and not in limitation, embodiments are contemplated where the list of possible communication nodes is prioritized either or both (or any proportional combination of parts thereof) on one or more, but at least one, session criteria associated with each of the communication nodes and a session type associated with each of the communication nodes. In additional embodiments, prioritization of the possible communication nodes can include fewer or additional elements, for example, an address family or address families accepted at a communication node, network conditions, network events, either or both of system administrator and user requirements, predetermined business rules stored at the local communication node database, business rules stored at the communication node, and the like.

At 340, the communication node can thereafter identify an optimized communication node from the list of possible communication nodes based on a set of business rules either or both received by or stored at the communication node. As used in the context of this exemplary method 300, throughout this specification, and the claims, business rules can primarily be defined as an instruction or set of instructions or specific criteria indicating one or more actions to be taken with respect to optimizing communication sessions for a given communication node or communication nodes. Business rules can also optionally be defined as including instructions for obtaining network information to further enable optimization of communication sessions involving the delivery of application data over third party networks, such as the public Internet. In one aspect, by way of example and not limitation, business rules define information needed to optimize certain communication sessions, ways to obtain such information, how to process such information, path (i.e., route) and/or node ranking methodologies, and include other similar types of information. Such actions dictated by business rules may be associated with satisfaction of a set of communication session criteria or conditions.

At 340, the set of business rules can be used, in one exemplary embodiment, to analyze the list of possible communication nodes based on any number of attributes and characteristics, including but not limited to: predetermined routing information associated with a communication session, one or more session criteria associated with a communication session, one or more session criteria associated with each of the possible communication nodes, one or more session type(s) associated with a communication session, one or more session type(s) associated with each of the possible communication nodes, and the like.

Thereafter at 350, the communication node can determine if the optimized communication node, identified at 340, receives communication sessions utilizing a first address family (provided, by way of example, as part of the session parameter(s) for the particular communication session) or a second address family. In one exemplary embodiment, the set of business rules stored at the communication node, as discussed above, can optionally be used to analyze the address family utilized by the determined optimized communication node. It is also contemplated, by way of additional embodiments, that the list of possible communication nodes can include an address family acceptance criteria as a priority factor. Additional embodiments are contemplated where the determination of address family type can be made based on business rules stored at another network location. Yet still further embodiments contemplate where the address family type is predetermined (i.e., at a local communication node database, or the like), and in these exemplary embodiments, a communication node will not be listed or prioritized as part of the list of possible communication nodes unless such communication node accepts communication sessions with an address family which corresponds to that of the given communication session.

If a communication node identified as an optimized communication node at 340, is determined at 350 to not receive communication sessions which have the first address family associated with the communication session, the communication node at 360 can modify an abstraction layer of the communication session. In this exemplary embodiment, one or more, but at least one, abstraction layer(s) can be modified by altering an implementation instruction which corresponds to a set of functionality of the abstraction layer, to allow transmission of that communication session to the optimized communication node. Inventive aspects of this modification will be discussed in more detail with reference to FIGS. 6 and 7.

Generally, in communication systems and networks, a communication session can have elements and characteristics that can be characterized using the "Open Systems Interconnection" model or the "OSI" model. The OSI model is a conceptual model that characterizes and standardizes the communication functionality of a computing system and its corresponding communication sessions, without regard to the underlying internal structure and technology of such system and sessions. Generally, in the OSI model, a communication session can be partitioned into seven abstraction layers. As used in this specification and the claims, an abstraction layer can chiefly be defined as a way of hiding the implementation details of a particular set of functionality, allowing a separation of applications and the like to facilitate interoperability between layers, hosts, and ultimately computing systems, as well as platform independence, the general concept of implementing a process on various computing devices with none or very few changes to the process between devices. An abstraction layer can also be known as an "abstraction level."

For purposes of this exemplary method 300, the OSI model had two major components, an abstract model of vertical networking (i.e., the seven-layer model) and a set of specific protocols. According to the seven-layer model, each abstraction layer serves the layer above it and is served by the layer below it. By way of example, a layer that provides error-free communications across a network provides the path or route needed by applications above it, while it calls the next lower layer to send and receive packets that comprise the contents of that path or route. The protocols enable one host to interact with another host, at corresponding abstraction layers. As such, the protocols can be embodied as "implementation instructions," or as more commonly characterized as an interface between a computing device's software and its hardware, which control a number of functionality (i.e., the range of operations that can occur on the computing device), for example, data handling and memory operations, arithmetic and logic operations, control flow operations, and the like, generally known as input and output operations.

At 370, the communication node thereafter can modify the predetermined routing information of the communication session based on either or both of the session criteria and the session type of the optimized communication node. Then, at 380, the communication session can be transmitted from the communication node to the optimized communication node. Method 300 thereafter ends at 390.

FIG. 4 illustrates one exemplary aspect of communication network 100, as illustrated above with reference to FIG. 1, a system 400 for optimizing communication sessions through a network comprising a series of network edge devices and communication nodes, utilizing one or more address families.

According to one exemplary embodiment, network edge device 440 can generally be a self-contained, compact, energy-efficient communication node operating proprietary OCS software from a flash memory or Solid State Drives. This device, as described previously with reference to network edge device 140, as illustrated in FIG. 1, can be one of any general-purpose or specialty computers, dedicated PBX servers, or other computing devices that perform (among other things) the functionalities of a communication node. As should be understood by one who is knowable in the art, network edge devices, such as network edge device 440, are not required to be physically installed at facilities or in relative proximity to assets (each as illustrated as facilities 188 and assets 192, 194 in FIG. 1, respectively); instead, such network edge devices can be virtually managed/operated within an intelligent asset (not shown) itself, via existing virtual servers relating to a facility (not shown), or the like.

According to an embodiment, network edge devices (or more generally nodes) receive information relating to a plurality of network nodes via an OCS directory (e.g., as shown in FIG. 3), and also receive business rules that dictate optimization criteria. In one embodiment, information in the OCS directory is collected by aspects of the OCS server module 112 and provided to network edge devices 106 or other nodes wherein such information is utilized for determining optimal communication session routes in combination with business rules, as will be better understood from the discussions in connection with FIGS. 4, 5, and 6. Generally, business rules are policies/criteria that govern various aspects of communication sessions. Examples of such criteria include a bandwidth requirement, a maximum tolerable packet loss rate, one or more allowable applications, number of active on-premises devices simultaneously engaged in communication sessions, a maximum tolerable delay in voice data transfers, a maximum tolerable jitter, a minimum video frame rate, allowable geographical locations of intermediate nodes, etc. Business rules are usually defined by OCS users or system administrators and are typically stored in the nodes.

As illustrated, system 400 comprises a plurality of components, including OCS 410, network edge device 440, networks 460, and optimized communication node 470. For simplicity of illustration, this exemplary embodiment does not depict other network and system components, such as network edge device(s), IP-PSTN gateway(s), PSTN(s), facilities or assets, however, each, all or any combination thereof of these components are contemplated for use as part of or in conjunction with system 400. In this exemplary embodiment, communication sessions may be initiated, terminated or otherwise transmitted through system 400 in the same or similar manner as described with reference to FIG. 1.

In one embodiment as illustrated in FIG. 4, OCS 410 monitors and collects real-time and historical network characteristics, applies business rules related to networks 460 characteristics, evaluates various communication session routes/paths, and if necessary modifies communication routes to account for the application of business rules and real-time networks 460 characteristics. Likewise, OCS server modules 412 are intended to be the same or similar to OCS server modules 112 as described and illustrated in more detail with reference to FIG. 1.

OCS databases 414, as illustrated in this exemplary embodiment, are contemplated to be any singular or collection of computer servers or communication nodes for storing data associated with providing communication sessions. OCS databases 414, in one example, may be relational or distributed, depending on the searching, organization, and modification requirements of administrator(s) or users. Further embodiments contemplate OCS databases 414 having content or structure as required by system 400, or in yet still additional embodiments, determined at the option of, based on a set of predetermined or dynamic business rules, system 400. These examples, however, are exemplary only and OCS databases 414 can have any configuration which is functionally necessary for OCS 410 or system 400 to operate.

In one exemplary aspect of the present embodiment, as illustrated in FIG. 4, OCS databases 414 can be locally accessible by other system 400 components (shown and not shown) and can store a directory or list of all possible communication nodes in networks 460, and, in additional embodiments, all possible communication nodes in other networks (not shown) through which a communication session may be routed. OCS databases 414, for example, store information needed by OCS 410, such as, for example, list, directory or other databases comprising information identifying communication nodes that are either or both known and capable of being either or both controlled and managed by OCS 410. In one embodiment, communication nodes, such as network edge device 440 and other communication nodes (not shown), can include network edge devices, originating nodes or source nodes, intermediary nodes, destination nodes or terminating nodes, as well as nodes that are potential "next-hop" relays.

In one exemplary embodiment, OCS database 414 provides a picture of the geography and routing infrastructure of networks 460, all or any of which can be operated and maintained by a plurality of third party service providers and carriers. In one embodiment, such a picture is evaluated on the basis of metrics such as pathway or connection quality, round trip times, jitter, packet loss rate, bandwidth, geographical location of communication nodes, and other metrics which are functionally necessary for system administrators or users to communicate within system 400. According to one exemplary embodiment, OCS databases 414 can be maintained and updated in a periodic manner by OCS server modules 412, by way of example, and not of limitation, by a provisioning server, a routing server, a statistics server, a network sampling server (all not shown individually, except as is intrinsic in the structure of OCS modules 412), and the like. As should occur to one of ordinary skill in the art, "periodic" can be every hour, minute, virtually continuously, or the like. It is contemplated that information contained in OCS databases 414 is shared with network edge device 440, other communication nodes (not shown), and OCS server modules 412, any or all of which may require the information. In this and other exemplary embodiments, such information can be used for determining optimal or optimized communication session routes in combination with business rules, as will be better understood from the discussion below.

As further illustrated in FIG. 4, OCS databases 414 are operatively coupled to network edge device 440. Furthermore, network edge device 440 comprises a hardware processor 421 which is operative to execute computer readable instructions stored in a memory 422. Additional elements, software(s), application(s), hardware, peripherals and structural components are further contemplated to be required for the functional enablement of network edge device 440, however, such elements software(s), application(s), hardware, peripherals and structural components are not illustrated (for simplicity purposes only). Such elements, software(s), application(s), hardware, peripherals and structural components may include but are not limited to, ports, buses, other input/output interfaces, displays, general use applications, operating system(s), and the like, or any such elements and structural components which are functionally necessary to adequately enable operation of network edge device 440.

Hardware processor 421 can be generally defined as the central processing unit (CPU) of network edge device 440, or the electronic circuitry within network edge device 440 (or any other computing device) that carries out the computer-executable instructions stored in memory 442, by performing basic operational functions, including but not limited to, for example, the basic arithmetic, logic, control and input/output (I/O) operations (if any) specified by the instructions.

Memory 442, as depicted in FIG. 4, may further comprise location(s) for operational components, application(s), software(s) and other computer executable instructions (any or all of which, as discussed above, are generally accessed from memory 442 by hardware processor 221). Memory 442 can generally be defined in a similar manner as memory 222 discussed as referenced in more detail and illustrated in FIG. 2. Memory 442, as illustrated, may also comprise retriever 444, identifier 446, determiner 448, and modifier 450. Memory 442 may further comprise additional operational elements not stated or illustrated as part of this specification, however, memory 442 is contemplated to act as a storage location for all functionally necessary elements which require storage when such functionally necessary elements are necessary for the functional enablement of communication node 220. Hardware processor 441 can access retriever 444, identifier 446, determiner 448, and modifier 450, each individually, one at a time, in any combination of grouping(s), and simultaneously, or in any other order or grouping as is functionally necessary to execute operations as dictated by other system 200 components, for example, such as OCS 410 or networks 460.

Communication session(s) can be initiated at network edge device 440, by the network edge device 440 receiving one or more, but at least one, session parameter which includes an indication of initiation for the communication session. In this exemplary instance, session parameter(s) may include, but are not limited to, a first address family, predetermined routing information for routing a communication session through a series of communication nodes and network edge devices, a session criteria, and a session type. Communication session initiation and session parameters at a network edge device 440 will be discussed in more detail with reference to FIG. 5, below.

In one embodiment, as illustrated in FIG. 4, hardware processor 441 accesses memory 442 to operably execute computing instructions embodied as retriever 444. Retriever 444 allows network edge device 440 to actively retrieve from OCS databases 414 a list of possible communication nodes and network edge devices containing all possible communication nodes and network edge devices in or operatively connected to networks 460, through which the communication session can be routed. In this exemplary embodiment, the list of possible communication nodes and network edge devices can be prioritized, at least in part, on a session criteria of each of the possible communication nodes and network edge devices and a session type of each of the possible communication nodes and network edge devices. Session criteria and session type(s) for the possible communication nodes will be discussed in more detail with reference to FIG. 5, below.

In one embodiment, the list of possible communication nodes and network edge devices can represent either or both potential and preferred "next-hop" nodes for a variety of session types. Additional embodiments are contemplated where the list of possible communication nodes and network edge devices can be generated based on an evaluation of the outcome of analyses utilizing the set of business rules, "real-time" networks 460 conditions, other communication node outage(s), and the like. Therefore, it should be appreciated that a list of possible communication nodes and network edge devices can be overruled, or otherwise modified based on several factors. In further embodiments, updates, review, evaluation, and modification of the list of possible communication nodes and network edge devices can occur both periodically and frequently. Specifically, possible communication nodes and network edge devices can be prioritized every minute, every ten minutes, every hour, or the like. Other embodiments contemplate processing requirements and computational efficiency, where updates, review, evaluation, and modification only occurs once per day or week, and the like. In yet still other embodiments, updates, review, evaluation, and modification may occur virtually continuously.

Examples of information that can be maintained for each possible communication node and network edge device includes, but is not limited to, IP addresses of the respective communication nodes and network edge devices, types of classifications of such nodes and devices, and type(s) of application data (e.g., audio, video, data, or any combination thereof) each respective communication node handles. Generally, classes or forking classes of communication nodes and network edge devices is a way of associating a predefined communication-related feature, such as, for example and in no way limited to, voice mail, IVR, conference calling, and other such features with one or more servers, such as a voice mail server, an IVR server, a conference server, and the like. In one embodiment, classification can be predefined by system users and/or system administrators. In other embodiments, classification can be based on the computing capabilities of the possible communication nodes and network edge devices, the number of communication nodes and network edge devices for a given class that, in one example, are already pre-existing in a given geographical area, and so on. In yet other embodiments, classification can be based on having the same number of communication nodes and network edge devices in every information category.

Additional embodiments are further contemplated where the list of possible communication nodes and network edge devices is stored at network edge device 440.

As illustrated in FIG. 4, hardware processor 441 can access memory 442 to operably execute computing instructions embodied as identifier 446. In this exemplary embodiment, identifier 446 allows network edge device 440 to actively identify an optimized communication node 470 from the list of possible communication nodes and network edge devices. Identifier 446, as part of the identification process, utilizes a set of business rules received to or stored at network edge device 440 to analyze the list of possible communication nodes and network edge devices. This analysis or identification using the set of business rules can involve, but is not required to involve, a comparison (one or more comparisons, but at least one, for functional enablement of the present embodiment) involving any combination of the following information: the predetermined routing information of the communication session, a session criteria of the communication session, a session criteria associated with each of the possible communication nodes and network edge devices, a session type of the communication session, and a session type associated with each of possible communication nodes and network edge devices. The method of identification, analysis, comparison, and the like, occurring at network edge device 440 involving each of the elements above, as well as descriptions of each said elements, will be detailed below with reference to FIG. 5, below.

Optimized communication node 470, as illustrated in FIG. 4, is a communication node having the same or similar elements, software(s), application(s), hardware, peripherals and structural components as network edge device 440, and may include but is not required to include, hardware processors, memories, ports, buses, other input/output interfaces, displays, general use applications, operating system(s), and the like, or any such elements and structural components which are functionally necessary to adequately enable operation of either or both network edge device 440 and optimized communication node 470. Additional embodiments are further contemplated where optimized communication node 470 is also network edge device 440, in the event that these exemplary communication nodes 220, 470 are each "virtual" elements of the same computing device.

Yet still further embodiments are contemplated where optimized communication node 470 is a network edge device, such as, for example, network edge devices 140, 440, as illustrated in FIGS. 1 and 4, or any combination of a series of connected network edge devices, in which, in this exemplary instance, network edge devices 140, 440 may be one or more devices. Yet still additional embodiments are contemplated where optimized communication node 470 is a network edge device, such as network edge devices 140, 440, which are also communication nodes, such as for example communication nodes 120, 220 (as illustrated in FIGS. 1 and 2), in the event that these exemplary communication nodes are each "virtual" elements of the same computing device.

Additional embodiments are contemplated where the set of business rules stored at network edge device 440 is determined at the network edge device based on any number of outside factors, including but not limited to networks 460 condition(s) and networks 460 event(s).

As described with reference to the exemplary embodiment illustrated by FIG. 4, business rules are typically stored at network edge device 440, in a location at least in part, defined as memory 442, and can be functionally practicable with any one or more, in any combination, order, or organization, with any elements contained in memory 442, for example, identifier 446, determiner 448, and modifier 450. Additional embodiments contemplate the business rules being stored at a wired or wirelessly connected, remote location, such as, for example, a cloud storage or remote server (not shown) operably coupled to network edge device 440.

Hardware processor 441 in FIG. 4 can also access memory 442 to operably execute computing instructions embodied as determiner 448. In this exemplary embodiment, determiner 448 allows network edge device 440 to actively determine, based on the set of business rules either or both received to or stored at network edge device 440, if the identified optimized communication node 470 receives communication sessions utilizing the communication session address family included as part of the session parameters, or a second address family. When and how analysis and determination of address family occur at network edge device 440 will be discussed in more detail with reference to FIG. 5, below.

FIG. 2 further illustrates modifier 450, which hardware processor 441 can access memory 442 to operably connect to. Modifier 430 can have a two-fold functionality of modifying one or more, but at least one, of a communication session's abstraction layers and modifying a communication session's predetermined routing information. Modifier 430, in such embodiments as exemplified in FIG. 4, can modify either or both of an abstraction layer and predetermined routing information based on any of the following individually or in conjunction with one another, by way of example and in no way limited to: the predetermined routing information, the session parameters of the communication session, the set of business rules, a session criteria of optimized communication node 470, and a session type of optimized communication node 470. When and how analysis and modification occur at network edge device 440 will be discussed in more detail with reference to FIGS. 5 and 7, below.

Figure 5:
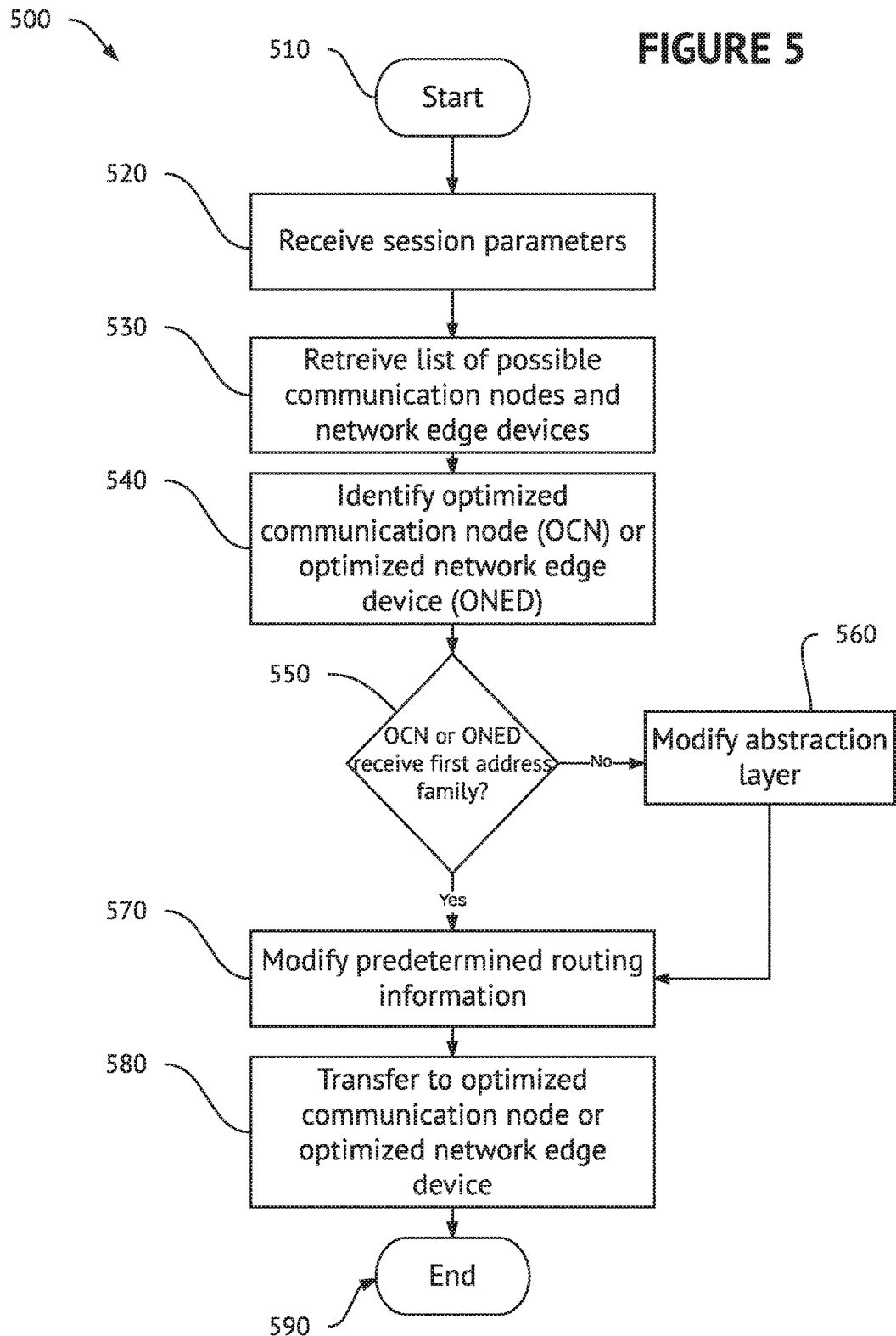
FIG. 5 illustrates one exemplary embodiment of the present invention, a method for optimizing a communication session through a network comprising a series of communication nodes and network edge devices, utilizing one or more address families.

The operation of certain aspects of the inventive concept illustrated in the exemplary embodiment depicted in FIG. 4 will now be described with reference to FIG. 5. FIG. 5, as described below, illustrates a logical flow diagram generally showing one embodiment of a process or method for optimizing a communication session through at least one network comprising a series of network edge devices and communication nodes which utilize one or more address families via, for example, the devices and systems described with respect to FIGS. 1, 2, and 4. Method 500 of FIG. 5 can be implemented in part, or whole, within network edge device 440 of FIG. 4. Furthermore, it is contemplated that steps can be either or both added and removed from method 500. The following detailed description, is, therefore, not to be taken in a limiting sense, and various embodiments envisioned by either or both adding and removing steps in the process may be readily combined, without departing from the scope or spirit of the invention.

As contemplated by this exemplary method 500, the one or more address families may be, for example, IP location descriptors which provide for the network transportation of application data from one computing device to another via a network. As discussed above with reference to FIG. 4, the one or more address families can be, for example, IPv4, IPv6, or another address family. Definitions may further include, for example, those stated above. In this particular context, the one or more address families specify the transport provider of a specific protocol. Also in this context, each of the network edge devices and communication nodes, within the series of network edge devices and communication nodes that comprise the network(s), is known its IP address.

As illustrated in FIG. 5, method 500 starts at 510. Thereafter, at 520 a network edge device, which may be independent or within a series of network edge devices and communication nodes, receives at least one session parameter indicating initiation of a communication session. As illustrated in this exemplary method 500, a session parameter received by a network edge device at 520 may comprise each individually, or any combination of the following features: a first address family; predetermined routing information for routing a communication session through a series of network edge devices and communication nodes; a session criteria; and a session type.

Once a session parameter initiating a communication session is received at a network edge device at step 520, a network edge device can thereafter retrieve a list of possible network edge devices and communication nodes from a local node database at 530. The local node database, in this exemplary embodiment, may have the same or similar attributes as described with reference to OCS databases 114, 414, as attributed in more detail in FIGS. 1 and 4. The list of possible network edge devices and communication nodes may contain, in one exemplary embodiment, all possible network edge devices and communication nodes within a network through which a communication session may be routed. In one exemplary embodiment, a list of possible network edge devices and communication nodes may contain, for example, all communication nodes and network edge devices within a certain geographical distance, and in one specific example, either or both of next-hop network edge devices and next-hop communication nodes. Further exemplary embodiments contemplate a list of possible network edge devices and communication nodes to include inclusive catalog(s) of communication nodes and network edge devices, such as, for example, all communication nodes and network edge devices which meet certain session criteria, all communication nodes and network edge devices which accept a certain communication session type, all communication nodes and network edge devices within all available networks, such as, for example, networks 160, 260, 460, and other networks, and the like. Further embodiments contemplate this list being dynamically modified, either or both at a local node database and at network edge device (such as, for example, network edge device 440), based on any number of limiting characteristics, by way of example and not in limitation, a session parameter or a combination of session parameters of a given communication session (as such is required by predetermined routing information), a communication session type, an address family, and the like.

A list of possible network edge devices and communication nodes can be, for example, generated in light of various other factors, such as but not limited to, real-time network conditions, various communication node outage(s), and the like. Therefore, it will be appreciated that a predetermined list of possible network edge devices and communication nodes can be overruled, or otherwise modified based on several factors. In addition, it should be understood that the process described in connection with FIG. 5 can occur periodically and frequently. In some embodiments, for the sake of processing requirements and computational efficiency, method 500 may only be performed once per day or week, or other extended time periods. In other embodiments, method 500 may occur virtually continuously. It should be even further appreciated that this methodology of generating a list of possible network edge devices and communication nodes can help eliminate communication session routes that have been impacted by communication failures, communication tower problems due to disaster, natural calamities, routine maintenance, or some other unpredictable reason.

At 530, it is further contemplated that the list of possible network edge devices communication nodes can be prioritized based on attributes of possible network edge devices and communication nodes contained in the list. For example, and not in limitation, embodiments are contemplated where a list of possible network edge devices and communication nodes can be prioritized either or both (or any proportional combination of parts thereof) on one or more, but at least one, session criteria associated with each of the network edge devices and communication nodes and a session type associated with each of the network edge devices and communication nodes. In additional embodiments, prioritization of possible network edge devices and communication nodes can include fewer or additional elements, for example, an address family or address families accepted at a network edge device or communication node, network conditions, network events, either or both of system administrator and user requirements, predetermined business rules stored at a local node database, business rules stored at a network edge device, and the like.

At 540, a network edge device can thereafter identify an optimized network edge device or optimized communication node from a list of possible network edge devices and communication nodes based on a set of business rules either or both received by or stored at the network edge device.

At 540, a set of business rules can be used, in one exemplary embodiment, to analyze a list of possible network edge devices and communication nodes based on any number of attributes and characteristics, including but not limited to: predetermined routing information associated with a communication session, one or more session criteria associated with a communication session, one or more session criteria associated with each of the possible network edge devices communication nodes, one or more session type(s) associated with a communication session, one or more session type(s) associated with each of the possible network edge devices and communication nodes, and the like.

Thereafter at 550, the network edge device can determine if an optimized network edge device or optimized communication node, identified at 540, receives communication sessions utilizing a first address family (provided, by way of example, as part of the session parameter(s) for the particular communication session) or a second address family. In one exemplary embodiment, the set of business rules stored at a network edge device, as discussed above, can optionally be used to analyze the address family utilized by a determined optimized network edge device or optimized communication. It is also contemplated, by way of additional embodiments, that a list of possible network edge devices and communication nodes can include an address family acceptance criteria as a priority factor. Additional embodiments are contemplated where a determination of address family type can be made based on business rules stored at another network location. Yet still further embodiments contemplate where an address family type is predetermined (i.e., at a local node database, or the like), and in these exemplary embodiments, a network edge device or communication node will not be listed or prioritized as part of the list of possible network edge devices and communication nodes unless such network edge device or communication node accepts communication sessions with an address family which corresponds to that of the given communication session.

If a network edge device or communication node identified as an optimized network edge device or optimized communication node at 540, is determined at 550 to not receive communication sessions which have a first address family associated with the communication session, a network edge device at 560 can modify an abstraction layer of the communication session. In this exemplary embodiment, one or more, but at least one, abstraction layer(s) can be modified by altering an implementation instruction which corresponds to a set of functionality of the abstraction layer, to allow transmission of that communication session to the optimized network edge device or optimized communication node. Inventive aspects of this modification will be discussed in more detail with reference to FIGS. 6 and 7.

At 570, the network edge device thereafter can modify the predetermined routing information of the communication session based on either or both of the session criteria and the session type of the optimized communication node and network edge device. Then, at 580, the communication session can be transmitted from the network edge device to the optimized communication node and network edge device. Method 500 thereafter ends at 590.

Figure 6:
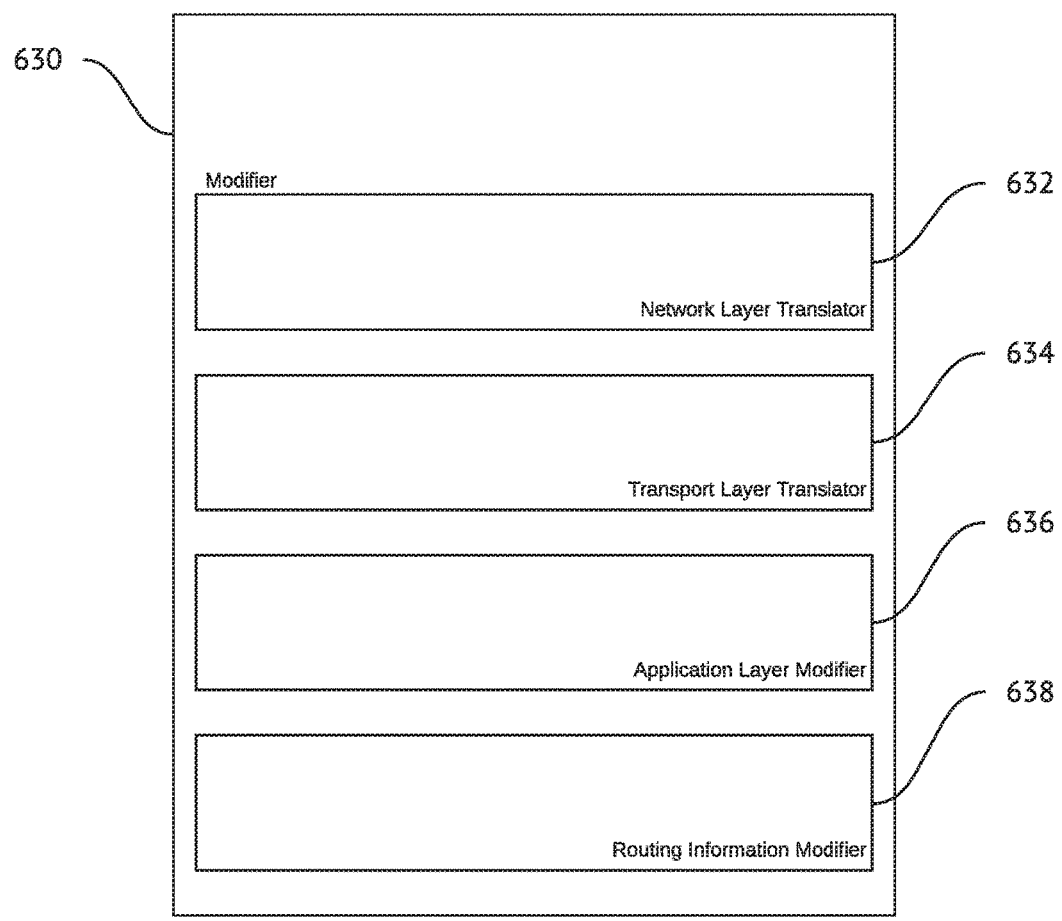
FIG. 6 illustrates one exemplary aspect of the present invention, an exemplary system embodiment for a translation from a first address family to a second address family at an abstraction layer.

FIG. 6 illustrates one exemplary aspect of the present invention, specifically a more detailed illustration and associated description of modifier 230 as represented in FIG. 2. Modifier 630, as herein illustrated, contains elements and components which embody an exemplary construction needed for a translation from a first address family to a second address family at an abstraction layer.

In the exemplary embodiment as illustrated in FIG. 6, modifier 630 comprises a plurality of computing elements, including network layer translator 632, transport layer translator 634, application layer modifier 636 and routing information modifier 638. Additional embodiments are contemplated with additional and less computing elements, and in one example, routing information modifier 638 can be contained in a separate memory space or computing module. It is contemplated that each computing element illustrated may operate individually, one at a time, either or both in sequential and random order(s), in any combination of grouping(s), simultaneously, or in any other order or grouping as is functionally necessary to execute operations as dictated by one or another system such as, for example, systems 200, 400 and their associated components, in this example, OCS 210, 410 or networks 260, 460, as each is illustrated in FIGS. 2 and 4, respectively.

For simplicity of illustration, this exemplary embodiment does not depict other network(s) and system components, such as hardware processors, memory, network(s), communication node(s) (such as, for example, communication node 220 illustrated in FIG. 2), network edge device(s) (such as, for example, network edge device 440 illustrated in FIG. 4), and the like however, each, all or any combination thereof of these components are contemplated for use as part of or in conjunction with modifier 630.

In this exemplary embodiment, modifier 630 can function independently or within a number of exemplary environments, such as but not limited to, being at least one of an operatively connected component for use on or with communication nodes (such as, for example, communication node 220 illustrated in FIG. 2), network edge devices (such as, for example, network edge device 440 illustrated in FIG. 4), or any other communications or computing device operatively connected to a network (such as, for example, networks 160, 260, 460). For simplicity of the written description contained in this section relating to FIG. 6, the exemplary environment used shall be a "communication node," but as used herein, this term can mean any such communication node(s), network edge device(s), or any other communication or computing device(s) operatively connected to a network as defined in this paragraph, or used throughout this specification and the claims. Furthermore, devices referred or referenced to, but not otherwise assigned an element number in FIG. 6, are the same or substantially similar to those referenced or discussed throughout this specification and the claims. The lack of illustration and element number is not for purposes of limiting such devices to this specific exemplary embodiment and figure, but to further remove complication from the description of the inventive aspects described in detail herein.

Modifier 630 can have a two-fold functionality of modifying one or more, but at least one, of a communication session's abstraction layers and modifying a communication session's predetermined routing information. Modifier 630, in such embodiments as exemplified in FIG. 6, can modify either or both of an abstraction layer and predetermined routing information based on any of the following individually or in conjunction with one another, by way of example and in no way limited to: predetermined routing information of a communication session, session parameter(s) of a communication session, a set of business rules received to or stored at a computing device associated with modifier 630, a session criteria of an optimized communication node, and a session type of an optimized communication node.

As illustrated in more detail with reference to FIGS. 2 through 5, a determiner (not shown in FIG. 6) can be operatively connected to a hardware processor to operably execute computing instructions at a communication node to actively determine, based on the set of business rules received to or stored at the communication node, if an identified optimized communication node receives communication sessions utilizing a communication session address family included as part of the session parameters, or a second address family.

As discussed above, an address family, address type, or IP address is ordinarily a numerical label assigned to any computing device which indicates where the computing device is located within a network. There is more than one type of address family or address type, including but not limited to, Internet protocol version 4 (IPv4), Internet protocol version 6 (IPv6), and the like.

When a communication session is received at a communication node and a determiner determines that the communication session's session parameters contain a first address family which is not compatible with the address family of a determined optimized communication, modifier 630 element network layer translator 632 can modify one or more, but at least one, implementation instruction associated with the set of functionality that comprises the network layer of the communication session, to translate at the network layer the first address family IP address to a second address family IP address. The translation as contemplated by network layer translator 632 can be based on any combination, but at least one of, the following: a set of business rules received to or stored at a communication node, a determination that the optimized communication node utilizes the second address family, a transport layer protocol of a communication session, and session parameter(s) of a communication session.

According to the OSI model, a network layer is an abstraction layer which provides the functional and procedural means of transferring variable length data sequences, each of which can generally be defined by the term "datagram," from at least one communication node to another connected to the same network. Also, in general terms, a network layer can translate a logical network address into a physical machine address. For illustrative purposes to further define a network layer, a network in this exemplary context may be contemplated to be a medium to which many communication nodes are connected, and each and every of those communication nodes has at least one network address and which permits those communication nodes connected to the network to transfer message(s) (or as the case as illustrated in this exemplary embodiment, communication sessions) to other communication nodes connected to the network by, for example, providing the content of the message or communication session and an address of a destination or terminating node for that message or communication session. In a traditional communication network or system, the network may passively allow the network to find a way to deliver the message or communication to the destination or terminating node. However, in an optimized communication network, such as, for example, communication network 100 as illustrated in FIG. 1, optimization components, such as OCS 110 (including but not limited to OCS modules 112 and OCS databases 114), can direct the message or communication session through an optimized communication node, including but not limited to, through intermediary or intermediate nodes.

For this exemplary embodiment, network layer translator 632 modifies an implementation instruction associated with a set of functionality that comprises the network layer following a communication node receiving a communication session. Upon receipt of the communication session and modifier 630 having access to the communication session, network layer translator 632 reviews each layer of the communication session, to determine, for example, which of the protocols contained within the communication session are the protocols (i.e., the "implementation instructions") associated with the network address(es) and machine address(es) of the communication session. For purposes of this example, these protocols or implementation instructions associated with the network address and machine address as described herein should be considered a "first address type" or "first address family." This analysis or algorithmic determination can be completed based on, for example, a set of business rules received to or stored at the communication node. If a determination that the optimized communication node utilizes an address family which is not the address family associated with the communication session, network layer translator 632 can modify the protocol(s) or implementation instruction(s) which state the network address(es) and machine address(es) by, for example, rewriting the string of numbers which is in the first address family format to a string of numbers in a second format, which, for example, convey the same or substantially the same information in the address family format acceptable to the optimized communication node.

In additional embodiments of network layer translator 632, the analysis or algorithmic determination can be based on a number of additional or other characteristics, including but not limited to at least one transport layer protocol of a communication session, and at least one other session parameter of a communication session. In these additional exemplary embodiments, under the OSI model, each abstraction layer is served by a "lower" abstraction layer and serves a "higher" abstraction layer. In this particular example, the network layer is a lower abstraction layer than a transport layer, and therefore, any transport layer protocols can be reviewed as part of the analytical review of the lower network layer protocols. In these embodiments, a transport layer protocol can be defined as implementation instructions which define a set of functionality associated with defining host-to-host communication services or applications between one or more communication nodes, such as, for example, connection-oriented data stream support, reliability support, data flow control, multiplexing, and the like.

Generally, if a message or communication session is too large to be transmitted from one communication node to another on a network layer, a network or optimizing element at a communication node or operatively coupled system, such as, for example, OCS 110, 210, 410 as illustrated in FIGS. 1, 2, and 4, can, in one exemplary embodiment, implement message delivery by splitting the message into several fragments or packets at one communication node, sending the fragments independently, and reassembling the packets at another communication node. In another exemplary embodiment, an optimizing element, such as, for example, OCS 110 can optionally or not dismantle a large message or communication session into packets, based on a number of factors, including but not limited to, a set of business rules received to or stored at the communication node, a list of possible communication nodes (in this specific example, the list of possible communication nodes accepting communication sessions with the session type and size of the particular communication session), and the like.

Transport layer translator 634, can, in various exemplary embodiments, randomly, in sequence, following or simultaneously with the network layer translation by network layer translator 632, modify one or more, but at least one, implementation instruction or protocol associated with the set of functionality comprising a user datagram protocol at a transport layer. Transport layer translator 634, can translate or modify, for example, a source service port and a destination service port based on any number of functionally necessary characteristics, including but not limited to any or a combination of the following: a set of business rules received to or stored at a communication node, a session type of a communication session (in a specific example where the communication session comprises any combination of audio data and video data), and an application layer protocol associated with the communication session.

According to the OSI model, a transport layer is an abstraction layer which is responsible for delivering data to an appropriate application process on one or more "host" computing devices, such as, for example, but not limited to, one of a next hop or other intermediary communication node or a destination communication node. To accomplish this data delivery, or transport, a transport layer can include any number or implementation instructions or protocols which direct statistical multiplexing of data from different application processes. Data multiplexing, in these exemplary embodiments, can be defined as combining any combination of analog or digital data signals or communication sessions into a single signal. This can include but is not limited to forming data packets and either simultaneously or thereafter adding source and destination port numbers in the header of each transport layer data packet. For these exemplary embodiments, the source and destination IP address(es) (which, in these exemplary embodiments can optionally be a rewritten second address family translated from a first address family at network layer translator 632), the port numbers, and multiplexed data signal can constitute what is generally known in the industry as a network socket, otherwise defined as an identification address of a "process-to-process" communication session. In the OSI model, the actual process-to-process communication session identified by the transport layer address is functionality supported at a session layer.

The implementation instructions or protocols commonly modified by the transport layer translator 634 can include, as stated above, one or more, but at least one user datagram protocol or "UDP." A UDP is a transmission protocol which, for example, provide one or more algorithms to verify data integrity and uses port numbers for addressing different functions at a source communication node, intermediary communication node, and destination communication node for the particular datagram, and the like. In these exemplary embodiments, a UDP generally has no introduction or "handshaking" dialogues, so there is no guarantee of delivery, ordering, or duplicate protection and is commonly suitable for purposes where error checking and correction is either not necessary or is performed at an application, avoiding the overhead of such processing at the network interface level. Communication networks, such as, for example, communication network 100, and other time-sensitive applications often use a UDP because dropping packets is preferable to waiting for delayed packets, which may not be an option in a real-time system. In additional embodiments, as contemplated herein, communication systems, such as those illustrated in FIGS. 2 and 4, which can include optimizing elements, such as OCS 210 and 410, can direct communication sessions containing UDP transport protocol(s) to either or both limit or substantially eliminate such packet dropping and delay based on any number or combination of optimizing characteristics, such as, for example and no way in limitation, a set of business rules received to or stored at a communication node including transport layer translator 634, a list of possible communication nodes (in this specific exemplary embodiment, where possible optimized communication nodes accept the type of the particular communication session, such characteristics as network events and network conditions, limit or substantially eliminate such packet dropping or loss), and the like.

For purposes of illustration, a source service port can generally be defined as a communication session "endpoint" in an operating system of a computing device. In this example, a port can be associated with an IP address of a host and a protocol type of a communication session, and where it is the source service port, completes the origination address of the communication session. The port number can be encoded in the transport protocol packet header and may be interpreted by the sending (i.e., the source or originating communication node), receiving (i.e., the destination or terminating communication node), and any intermediary communication nodes or other network infrastructure components.

Also by way of example, a destination service port can generally be defined as the port which completes the termination address of a communication session. The port number can be encoded in the transport protocol packet header and may be interpreted by the sending (i.e., the source or originating communication node), receiving (i.e., the destination or terminating communication node), and any intermediary communication nodes or other network infrastructure components.

Once transport layer translator 634 has access to the communication session (e.g., whether or not a network layer translation is required to transfer the communication session to an optimized communication node), transport layer translator 634 can review each layer of the communication session to determine, for example, either or both of the transport layer and the associated transport layer protocols based on a set of business rules received to or stored at a communication device to which transport layer translator 634 is an integrated or associated element. In this specific exemplary embodiment, when at least one of the transport layer protocols is a UDP and the network layer has been translated so that a first address family IP address is rewritten to a second address family IP address, transport layer translator 634 can, for example, translate either or both of a source service port and a destination service port by rewriting the string of numbers associated with either or both of the respective port addresses in one format to a string of numbers which convey the same or substantially the same information in a second format. Additional embodiments are contemplated where this translation can optionally occur in the absence of a translation from a first address family to a second address family at the network layer via network layer translator 632. Additional embodiments are further contemplated where the transport layer protocol which can be modified is a protocol other than a UDP, for example, a transmission control protocol or "TCP," a stream control transmission protocol or "SCTP," or the like. These additional embodiments contemplate an application requiring error correction facilities at the network interface level, which, as stated above, is not common in a standard communications system.

In additional embodiments of transport layer translator 634, the analysis or algorithmic determination of either or both of the transport layer and associated transport layer protocol(s) can be based on a session type of a communication session, regardless if a network layer has also been translated, if a particular communication session type includes any combination of audio data, a digital data stream containing digital signals in the audible range (i.e., sound), and video data, a digital stream containing a representation of moving visual images (i.e., a series of digital images displayed in rapid succession). UDP transport protocols are frequently used a transport layer protocol where a communication session contains either or both of audio and video data because a UDP is stateless (i.e., data packets are individually addressed and routed based on an information data string carried as part of each data packet without prior arrangement of a data channel) and does not retransmit data packets if any are lost, both of which are beneficial in "real-time" applications such as, for example, VoIP communication applications, chat features, and online games.

In other exemplary embodiments of transport layer translator 634, the analysis or algorithmic determination of either or both of the transport layer and associated transport layer protocol(s) can be based on an application layer protocol associated with a communication session. Application layer protocols typically include implementation instructions for identifying communication partners, determining resource availability, synchronizing communication, and the like. In these exemplary embodiments, under the OSI model, the transport layer is a lower abstraction layer than the application layer, and therefore the transport layer functionality serves the application, and in this particular example, any application layer protocols can be reviewed as part of the analytical factor in the review of any lower transport layer protocols. Yet still, additional embodiments contemplate that the application layer protocol(s) which can be an analytical factor characteristics used by transport layer translator 634 can be either or both of a real-time transport protocol or "RTP" and a session initiation protocol or "SIP."

In these exemplary embodiments, an RTP can be defined as an application-layer protocol for the real-time transport of data such as audio and video data. Generally, RTP is equipped to handle the characteristics of IP routing, such as missing packets and out-of-sequence aggregation of packets. An application layer control (signaling) protocol for setting up, modifying, and disconnecting communication sessions involving one or more participants, such as two-party (unicast), or multi-party sessions comprising one or more media streams. SIP, on the other hand, generally does not handle the actual transmission of the application data or media streams. SIP is an application layer control for setting up, modifying, and disconnecting communications involving one or more users. Usually, a protocol such as RTP actually delivers the application data or media streams. SIP is similar to the HTTP or SMTP protocols in that a SIP message comprises headers and a message body. SIP can generally be regarded as the enabler protocol for telephony VoIP services.

Application layer modifier 636 in modifier 630 can modify an application layer, for example, one or more, but at least one implementation instruction(s) or protocol(s) that comprise a session description protocol or "SDP." Under the OSI model, an application layer is an abstraction layer which is the user (i.e., communication session user, or end-user) interface responsible for displaying or otherwise transmitting received communication session information to a user, by way of example but not in limitation, on a display screen, over a telephone handset, or the like. Also, generally, this layer specifies the shared protocols and interface methods (i.e., the protocol(s) and interface(s) that a source communication node and a destination communication, as well as any intermediary communication node(s), have in common) used by communicating communications nodes in a network.

An SDP can generally be defined as a format for describing streaming media initialization parameters, for example, intended for describing multimedia (i.e., any combination of audio, video, and data session types) communication sessions for the purposes of session announcement, session invitation, and parameter negotiation. In exemplary embodiments, an SDP can comprise one or more, but at least one of the following: a communication session announcement, a communication session invitation, and session parameter negotiation data. According to the Internet Engineering Task Force (IETF®) a communication session announcement can be defined as a mechanism by which a session description is conveyed to users (i.e., communication system users or end users) in a proactive fashion, in one example, where the communication session is not explicitly requested by a user. A communication session invitation, on the other hand, can be defined as a handshake or request where a communication session initiated at a source or originating communication node is "accepted" at a destination or terminating communication node. Also, session parameter negotiation data can generally be defined as data where an initiating communication session "constructs" an "offer" SDP session description that lists the session types and other parameters, such as for example, codecs (i.e., programming for encoding or decoding a digital data stream) and other SDP parameters that the source or originating communication node is willing to use. In exemplary embodiments, this "offer" session description is sent to a destination communication node, which can optionally choose from among the session types, codecs and other session description parameters provided, and thereafter generate an "answer" session description with accepted parameters, based on that choice. The "answer" session description can be sent back to the originating or source communication node, thereby completing the session negotiation and enabling the establishment of the negotiated session type(s). Additional embodiments are contemplated where the originating and destination communication nodes can also be intermediary communication nodes.

To modify an implementation instruction associated with a set of functionality that comprises an SDP, application layer modifier 636 can rewrite any one or a combination of a communication session announcement, a communication session invitation, and session parameter negotiation data. In exemplary embodiments, application layer modifier 636 can modify any of these elements, for example, to address a modification at either or both of the network layer and the transport layer. Specifically, and as will be discussed in more detail with reference to FIG. 7, if the UDP modified by transport layer translator 634 is, in one exemplary embodiment, a SIP transport protocol, then an SDP header and body must be rewritten from one format to a second format to address any modifications made to either or both of source and destination port identifiers associated with a multiplexing functionality of a UDP, specifically in this exemplary embodiment, for voice data session types. Additional embodiments are further contemplated where a transport layer protocol is an RTP transfer protocol or other transfer protocol, with any combination of SDP elements being modified to address unicast and multiplexing functionality associated with any combination of voice, video, and computing data.

Modification of the SDP by application layer modifier 636 can be based, in exemplary embodiments as contemplated herein, for example, on any one or combination of a set of business rules received to or stored at a communication node, a session type of a communication session, a translation at a network layer, and a modification at a transport layer. Since an application layer is the highest abstraction layer and does not "serve" any higher abstraction layer, higher level protocols cannot be analytical factors for determining whether or not an application layer element either can be or should be modified. However, whether or not lower level abstraction layer protocols have been modified can be a determining characteristic, for example, whether or not a UDP or address family has been modified. Additional embodiments are contemplated where any one or a combination of the application layer protocol elements are modified when either, both, or any combination thereof of a network layer protocol (i.e., address family or type), a transport layer protocol that is a SIP, and a transport layer protocol that is an RTP are, at least in part, modified to address transmission from a communication node to an optimized communication node.

Once a communication session has been either or both of analyzed and modified by network layer translator 632, transport layer translator 634, and application layer modifier 638, routing information modifier 638, can optionally modify predetermined routing information associated with a communication session. In one exemplary embodiment, when a communication node receives a communication session, as part of an initiation of the communication session, the communication node receives a number of session parameters, including predetermined routing information. Depending on a number of analytical steps, discussed in more detail with reference to FIGS. 3, 5, and 7, once an optimized communication node is determined as a next hop communication node, the predetermined routing information may need to be modified to rewrite the header of the communication session to direct the communication to the optimized communication node instead of to a predetermined next hop communication node. This modification can include, for example, analysis and algorithmic determination based on a number of characters, including but not limited to, a set of business rules received to or stored at a communication node, a determination of an optimized communication node which is not a predetermined next hop communication node, any one or a combination of the translations and modifications as discussed in reference to this FIG. 6, a network condition, a network event, and the like.

The operation of certain aspects of the inventive concept as illustrated in the exemplary embodiment depicted in FIG. 6 will now be described with respect to FIG. 7. FIG. 7, as described below, illustrates a logical flow diagram generally showing one embodiment of a process or method for optimizing a communication session by abstraction layer translation, where the communication session is traveling through a network comprising a series of communication nodes which utilizes one or more address families. The method, as herein contemplated, may include, for example, any of the devices and systems described above in reference to FIGS. 1 through 6. Method 700 of FIG. 7 can be implemented in part, or whole, within network communication node 220 of FIG. 2 or network edge device 440 of FIG. 4, and more specifically, within modifier 630 as illustrated in FIG. 6. Additional embodiments contemplate that method 700 may operatively function on any communications or computing device operatively coupled to a network. Furthermore, it is contemplated that steps can be added and/or removed from method 700, or that method 700 can optionally be integrated into either or both of the methods 300, 500, disclosed in reference to FIGS. 3 and 5. The following detailed description is, therefore, not to be taken in a limiting sense, and various embodiments envisioned by adding and/or removing steps in the process may be readily combined, without departing from the scope or spirit of the invention.

For simplicity of the written description contained in this section relating to FIG. 7, the exemplary environment used shall be a "communication node," but as used herein, this term can mean any such communication node(s), network edge device(s), or any other communication or computing device(s) operatively connected to a network as defined in this paragraph, or used throughout this specification and the claims. Furthermore, devices referred to or referenced are the same or substantially similar to those referenced or discussed throughout this specification and the claims. The lack of illustration and element number is not for purposes of limiting such devices to this specific exemplary method and figure, but to further remove complication from the description of the inventive aspects described in detail herein.

Method 700 starts at 710. Thereafter, at 750, a determination is made at a receiving communication node where a communication session has been received (i.e., where the communication node is one of a network edge device, an originating node, an intermediary node, or a destination node) whether or not a determined optimized communication node (such as is determined, for example, in method steps 340, 540 illustrated in FIGS. 3 and 5) accepts communication sessions having a first address family IP address, as is associated with the initiated communication session. If the optimized communication node does accept communication sessions utilizing this first address family, the communication session thereafter has its predetermined routing information modified at 770, so that the optimized communication can accept the communication session (based on other priority factors for determining communication pathways discussed elsewhere in this specification and the claims, but irrespective, for example, of address family associated with the communication session), as a "next-hop" or destination for the communication session. Following this modification of the predetermined routing information, a communication session can thereafter be transferred to the optimized communication node at 780, with the method ending at 790.

If, at 750, a determination is made at a communication node that the optimized communication node does not accept communication sessions which utilize a first address family associated with a particular communication session, the communication node can translate at the network layer at 760, the first address family into a second address family, where the second address family is an address family type which can be accepted at the optimized communication node.

Thereafter, at 762, a second determination can be made, commonly by a computing element such as transport layer translator 634 as illustrated in FIG. 6, whether or not a communication session has as its transport layer user datagram protocol (UDP) either or both of a real-time transport protocol (RTP) or session initiation protocol (SIP) as one of its transport layer protocol. It is contemplated that a communication session can have either or both of an RTP and SIP as transport layer protocol(s), as a communication session can have any number of transport layer protocols to help facilitate transfer of the communication session through various interconnected networks, especially, in one specific example, the public Internet which is hosted by various different entities via a multitude of different interconnected computing devices. Various transport protocols can be used, for example, for different types of data which can comprise a communication session, for example, audio, video, computing data, or any combination thereof.

If at 762, a determination is made that a transport layer contains an RTP transport protocol, the UDP can be modified at either or both of the source and destination service ports at 764, to, in one aspect, clean up the transport layer to accommodate the earlier translation from the first address family to the second address family at 760. As is noted above, source and destination service ports can be communication session endpoints within an operating system, which have at least one associated IP address, which complete each of the originating and terminating addresses for the communication session.

If at 762, a determination is made the transport layer contains a SIP as at least one of its transport layer protocols, the UDP can be modified at the source and destination service ports at 766, to, in one aspect, clean up the transport layer to accommodate the earlier translation from the first address family to the second address family at 760. This modification, as contemplated at method step 766, may occur through the same or similar functionality as required to modify the RTP source and destination service ports. Since a SIP session is different than RTP session, this method step 766 is described for illustrative purposes only to show the distinction necessitated thereafter by step 768, as a communication can have any number of transport protocols, including any combination of either or both of SIP and RTP. SIP and RTP are not interchangeable due to the type(s) of data types (i.e., session types) that can be associated with each of these transport protocols, respectively.

Additional embodiments of method 700 are contemplated where a transport layer UDP can comprise both an RTP and SIP transport layer protocols. In these exemplary embodiments, it is contemplated that method steps 764, 766, and 768 can occur, for example, sequentially or simultaneously. Yet still additional embodiments are contemplated where a transport layer UDP does not comprise either of an RTP or SIP transport layer protocols. In these exemplary embodiments, it is contemplated that no UDP modification(s) occur, and, for example, the method resumes at method step 770.

Following the UDP source and destination port translation of the SIP transport protocol at 768, a session description protocol (SDP) of the SIP communication session can be modified at an application layer, to, in one aspect, clean up the application layer to accommodate the earlier translation from the first address family to the second address family at 760. As noted earlier, SIP is generally a transport layer protocol for signaling and controlling communication sessions which contain certain session types of data, for example, audio, and video data. SIP works in concert with several other protocols, such as for example, UDP, transmission control protocol (TCP), stream control transmission protocol (SCTP), and the like, and is commonly used for setting up, modifying, and tearing down voice and video data communication sessions. As illustrated in FIG. 7, an SDP is generally a transport protocol that accompanies streaming voice and video data communication sessions (i.e., SIP communication session involving voice data, video data, or any combination thereof). Where a SIP communication session has had source and destination service port identifiers modified at 766 to remain consistent with an earlier network layer translation at 760, from a first address family to a second address family, an associated SDP can have head and body identifiers rewritten from one format to a second format to address, at 768, the UDP modifications.

Additional embodiments are contemplated where additional transport layer protocols, which often times are dependent on the session types of a particular communication session, can be modified based on any combination of an address family translation at 760, UDP modifications at 764, 766, and an SDP modification at 768.

Thereafter, either or both of the modified SIP and RTP communication sessions are modified at 770 by the communication node to revise the predetermined routing information provided to the communication node as part of the session parameter(s) associated with the communication session and provided at the initiation of the communication session (as illustrated in FIGS. 3 and 5 at method steps 320, 520, respectively). This modification at 770 for SIP and RTP communication sessions is the same or similar as discussed above, where the modification of the routing information is made, at least in part, so that the communication node can transfer the communication session to an optimized communication node. A communication session can thereafter be transferred to the optimized communication node at 780 and the method ends at 790.

Additional methods, aspects, and elements of the present inventive concept are contemplated in use in conjunction with individually or in any combination thereof which will create a reasonably functional method, system, and device to be of use as a cigar band recognition interface. It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention.

Moreover, particular exemplary features described herein in conjunction with specific embodiments and/or aspects of the present invention are to be construed as applicable to any embodiment described within, enabled thereby, or apparent therefrom. Thus, the specification and drawings are to be regarded in a broad, illustrative, and enabling sense, rather than a restrictive one. It should be understood that the above description of the embodiments of the present invention are susceptible to various modifications, changes, and adaptations, and the same are intended to be comprehended within the meaning and range of equivalents of the appended claims.

Therefore, we claim:

1. A method for optimizing a communication session through at least one network comprising a series of communication nodes utilizing one or more address families, the method comprising:
   receiving at least one session parameter at a communication node within the series of communication nodes indicating initiation of the communication session, the at least one session parameter comprising a first address family, predetermined routing information for routing the communication session through the series of communication nodes, a session criteria, and a session type;
   retrieving to the communication node from a local communication node database a list of possible communication nodes containing all possible communication nodes in the at least one network through which the communication session may be routed, wherein the list of possible communication nodes is prioritized based at least in part on a session criteria of each of the possible communication nodes and a session type of each of the possible communication nodes;
   identifying at the communication node based on a set of business rules stored at the communication node an optimized communication node from the list of possible communication nodes, wherein the set of business rules is used to analyze the list of possible communication nodes based at least in part on the predetermined routing information of the communication session, the session criteria of the communication session, the session criteria of each of the possible communication nodes, the session type of the communication session, and the session type of each of the possible communication nodes;

determining at the communication node if the optimized communication node receives communication sessions utilizing the first address family of the communication session or a second address family;

modifying at the communication node at least one abstraction layer of the communication session based on the set of business rules by modifying at least one implementation instruction for a set of functionality of the at least one abstraction layer to allow transmission of the communication session to the optimized communication node utilizing either of one of the first address family or the second address family; and modifying the predetermined routing information of the communication session based on the session criteria of the optimized communication node and the session type of the optimized communication node; wherein the communication session is transmitted from the communication node to the optimized communication node.

2. The method of claim 1, wherein the communication node within the series of communication nodes is at least one of an originating node, an intermediary node, and a destination node.

3. The method of claim 1, wherein the first address family comprises at least one of Internet protocol version 4 (IPv4) and Internet protocol version 6 (IPv6).

4. The method of claim 1, wherein the second address family comprises at least one of IPv4 and IPv6.

5. The method of claim 1, wherein the first address family or the second address family comprises neither of IPv4 and IPv6.

6. The method of claim 1, wherein the list of possible communication nodes is stored at the communication node.

7. The method of claim 1, wherein the set of business rules is determined at the communication node based on at least one of a network condition and a network event.

8. The method of claim 1, wherein modifying the at least one implementation instruction for the set of functionality of the at least one abstraction layer comprises a translation at a network layer of a first address family Internet protocol (IP) address to a second address family IP address based on at least one of the set of business rules, a determination the optimized communication node utilizes the second address family, at least one transport layer protocol, and the at least one session parameter.

9. The method of claim 1, wherein modifying the at least one implementation instruction for the set of functionality of the at least one abstraction layer comprises modifying at a transport layer a user datagram protocol (UDP) by a translation of at least one of a source service port and a destination service port based on at least one of the business rules, the session type of the communication session, and at least one application layer protocol.

10. The method of claim 9, wherein the at least one application layer protocol comprises at least one of a real-time transport protocol (RTP) and a session initiation protocol (SIP).

11. The method of claim 1, wherein modifying the at least one implementation instruction for the set of functionality of the at least one abstraction layer comprises modifying at an application layer a session description protocol (SDP) containing at least one of a communication session announcement, a communication session invitation, and a session parameter negotiation data, wherein the modification at the application layer is based on at least one of the set of business rules, the session type of the communication session, a translation at a network layer, and a modification at a transport layer.

12. The method of claim 11, wherein modification of the application layer occurs when the communication session at the application layer comprises at least one of an RTP and a SIP.

13. The method of claim 11, wherein modification of the application layer occurs if the translation occurs at the network layer or the modification occurs at a transport layer.

14. The method of claim 11, wherein modification of the application layer occurs if the translation occurs at the network layer and the modification occurs at the transport layer.

15. A method for optimizing a communication session through at least one network comprising a series of communication nodes and network edge devices utilizing one or more address families, the method comprising:

receiving at least one session parameter at a network edge device within the series of communication nodes and network edge devices indicating initiation of the communication session, the at least one session parameter comprising a first address family, predetermined routing information for routing the communication session through the series of communication nodes and network edge devices, a session criteria, and a session type;

retrieving to the network edge device from a local communication node database a list of possible communication nodes and network edge devices containing all possible communication nodes and all possible network edge devices in the at least one network through which the communication session may be routed, wherein the list of possible communication nodes and network edge devices is prioritized based at least in part on a session criteria of each of the possible communication nodes, a session criteria of each of the possible network edge devices, a session type of each of the possible communication nodes, and a session type of each of the possible network edge devices;

identifying at the network edge device based on a set of business rules stored at the network edge device an optimized communication node or an optimized network edge device from the list of possible communication nodes and network edge devices, wherein the set of business rules is used to analyze the list of possible communication nodes and network edge devices based at least in part on the predetermined routing information of the communication session, the session criteria of the communication session, the session criteria of each of the possible communication nodes, the session criteria of each of the possible network edge devices, the session type of the communication session, the session type of each of the possible communication nodes, and the session type of each of the possible network edge devices;

determining at the network edge device if the optimized communication node or the optimized network edge device receives communication sessions utilizing the first address family of the communication session or a second address family;

modifying at the network edge device at least one abstraction layer of the communication session based on the set of business rules by modifying at least one implementation instruction for a set of functionality of the at least one abstraction layer to allow transmission of the communication session to the optimized communication node or the optimized network edge device utilizing either of one of the first address family or the second address family; and modifying the predetermined routing information of the communication session based on either of a session criteria of the optimized communication node and a session type of the optimized communication node or a session criteria of the optimized network edge device and a session type of the optimized network edge device; wherein the communication session is transmitted from the network edge device to the optimized communication node or the optimized network edge device.

16. The method of claim 15, wherein the network edge device is at least one of an originating node, an intermediary node, and a destination node.

17. The method of claim 15, wherein the network edge device is operatively connected to one or more communication assets for enabling the communication through the at least one network with at least one other communication asset.

18. The method of claim 15, wherein the first address family comprises at least one of IPv4 and IPv6.

19. The method of claim 15, wherein the second address family comprises at least one of IPv4 and IPv6.

20. The method of claim 15, wherein the first address family or the second address family comprises neither of IPv4 and IPv6.

21. The method of claim 15, wherein the list of possible communication nodes and network edge devices is stored at the network edge device.

22. The method of claim 15, wherein the set of business rules is determined at the network edge device based on at least one of a network condition and a network event.

23. The method of claim 15, wherein modifying the at least one implementation instruction for the set of functionality of the at least one abstraction layer comprises a translation at a network layer of a first address family IP address to a second address family IP address based on at least one of the set of business rules, a determination that the optimized communication node or the optimized network edge device utilizes the second address family, at least one transport layer protocol, and the at least one session parameter.

24. The method of claim 15, wherein modifying the at least one implementation instruction for the set of functionality of the at least one abstraction layer comprises modifying at a transport layer a UDP by a translation of at least one of a source service port and a destination service port based on at least one of the set of business rules, the session type of the communication session, and at least one application layer protocol.

25. The method of claim 24, wherein the at least one application layer protocol comprises at least one of an RTP and a SIP.

26. The method of claim 15, wherein modifying the at least one implementation instruction for the set of functionality of the at least one abstraction layer comprises modifying at an application layer an SDP containing at least one of a communication session announcement, a communication session invitation, and a session parameter negotiation data, wherein the modification at the application layer is based on at least one of the set of business rules, the session type of the communication session, and a translation at a network layer, and a modification at a transport layer.

27. The method of claim 26, wherein modification of the application layer occurs when the communication session at the application layer comprises at least one of an RTP and a SIP.

28. The method of claim 26, wherein modification of the application layer occurs if the translation occurs at the network layer or the modification occurs at a transport layer.

29. The method of claim 26, wherein modification of the application layer occurs if the translation occurs at the network layer and the modification occurs at the transport layer.

30. A system for optimizing a communications session through at least one network comprising a series of communication nodes utilizing one or more address families, the system comprising:

a local communication node database for storing a list of possible communication nodes in the at least one network through which the communication session may be routed; and a communication node operatively coupled to the local communication node database and comprising a hardware processor operative to:

receive at least one session parameter at the communication node indicating initiation of the communication session, the at least one session parameter comprising a first address family, predetermined routing information for routing the communication session through the series of communication nodes, a session criteria, and a session type;

retrieve to the communication node from the local communication node database the list of possible communication nodes containing all possible communication nodes in the at least one network through which the communication session may be routed, wherein the list of possible communication nodes is prioritized based at least in part on a session criteria of each of the possible communication nodes and a session type of each of the possible communication nodes;

identify at the communication node based on a set of business rules stored at the communication node an optimized communication node from the list of possible communication nodes, wherein the set of business rules is used to analyze the list of possible communication nodes based at least in part on the predetermined routing information of the communication session, the session criteria of the communication session, the session criteria of each of the possible communication nodes, the session type of the communication session, and the session type of each of possible communication nodes;

determine at the communication node if the optimized communication node receives communication sessions utilizing the first address family of the communication session or a second address family;

modify at the communication node at least one abstraction layer of the communication session based on the set of business rules by modifying at least one implementation instruction for a set of functionality of the at least one abstraction layer to allow transmission of the communication session to the optimized communication node utilizing either of one of the first address family or the second address family; and modify the predetermined routing information of the communication session based on a session criteria of the optimized communication node and a session type of the optimized communication node; wherein the communication session is transmitted from the communication node to the optimized communication node.

31. The system of claim 30, wherein the communication node within the series of communication nodes is at least one of an originating node, an intermediary node, and a destination node.

32. The system of claim 30, wherein the first address family comprises at least one of IPv4 and IPv6.

33. The system of claim 30, wherein the second address family comprises at least one of IPv4 and IPv6.

34. The system of claim 30, wherein the first address family or the second address family comprises neither of IPv4 and IPv6.

35. The system of claim 30, wherein the list of possible communication nodes is stored at the communication node.

36. The system of claim 30, wherein the set of business rules is determined at the communication node based on at least one of a network condition and a network event.

37. The system of claim 30, wherein modifying the at least one implementation instruction for the set of functionality of the at least one abstraction layer comprises a translation at a network layer of a first address family IP address to a second address family IP address based on at least one of the set of business rules, a determination the optimized communication node utilizes the second address family, at least one transport layer protocol, and the at least one session parameter.

38. The system of claim 30, wherein modifying the at least one implementation instruction for the set of functionality of the at least one abstraction layer comprises modifying at a transport layer a UDP by translating at least one of a source service port and a destination service port based on at least one of the set of business rules, the session type of the communication session, and at least one application layer protocol.

39. The system of claim 38, wherein the at least one application layer protocol comprises at least one of an RTP and a SIP.

40. The system of claim 30, wherein modifying the at least one implementation instruction for the set of functionality of the at least one abstraction layer comprises modifying at an application layer an SDP containing at least one of a communication session announcement, a communication session invitation, and a session parameter negotiation data, wherein the modification at the application layer is based on at least one of the set of business rules, the session type of the communication session, and a translation at a network layer, and a modification at a transport layer.

41. The system of claim 40, wherein modification of the application layer occurs when the communication session at the application layer comprises at least one of an RTP and a SIP.

42. The system of claim 40, wherein modification of the application layer occurs if the translation occurs at the network layer or the modification occurs at a transport layer.

43. The system of claim 40, wherein modification of the application layer occurs if the translation occurs at the network layer and the modification occurs at the transport layer.

44. A system for optimizing a communications session through at least one network comprising a series of communication nodes and network edge devices utilizing one or more address families, the system comprising:
a local node database for storing a list of possible communication nodes and network edge devices in the at least one network through which the communication session may be routed; and
a network edge device operatively coupled to the local node database and comprising a hardware processor operative to:
receive at least one session parameter at the network edge device indicating initiation of the communication session, the at least one session parameter comprising a first address family, predetermined routing information for routing the communication session through the series of communication nodes and network edge devices, a session criteria, and a session type;
retrieve to the network edge device from the local node database the list of possible communication nodes and network edge devices containing all possible communication nodes and all possible network edge devices in the at least one network through which the communication session may be routed, wherein the list of possible communication nodes and network edge devices is prioritized based at least in part on a session criteria of each of the possible communication nodes, a session type of each of the possible communication nodes, a session criteria of each of the possible network edge devices, and a session type of each of the possible network edge devices;
identify at the network edge device based on a set of business rules stored at the network edge device an optimized communication node or an optimized network edge device from the list of possible communication nodes and network edge devices based at least in part on the predetermined routing information of the communication session, the session criteria of the communication session, the session criteria of each of the possible communication nodes, the session criteria of each of the possible network edge devices, the session type of the communication session, the session type of each of the possible communication nodes, and the session type of each of the possible network edge device;
determine at the network edge device if the optimized communication node or the optimized network edge device receives communication sessions utilizing the first address family of the communication session or a second address family;
modify at the network edge device at least one abstraction layer of the communication session based on the set of business rules by modifying at least one implementation instruction for a set of functionality of the at least one abstraction layer to allow transmission of the communication session to the optimized communication node or the optimized network edge device utilizing either of one of the first address family or the second address family; and
modify the predetermined routing information of the communication session based on either of a session criteria of the optimized communication node and a session type of the optimized communication node or a session criteria of the optimized network edge device and a session type of the optimized network edge device; wherein the communication session is transmitted from the network edge device to the optimized communication node or the optimized network edge device.

45. The system of claim 44, wherein the network edge device is at least one of an originating node, an intermediary node, and a destination node.

46. The system of claim 44, wherein the network edge device is operatively connected to one or more communication assets for enabling the communication through the at least one network with at least one other communication asset.

47. The system of claim 44, wherein the first address family comprises at least one of IPv4 and IPv6.

48. The system of claim 44, wherein the second address family comprises at least one of IPv4 and IPv6.

49. The system of claim 44, wherein the first address family or the second address family comprises neither of IPv4 and IPv6.

50. The system of claim 44, wherein the list of possible communication nodes and network edge devices is stored at the network edge device.

51. The system of claim 44, wherein the set of business rules is determined at the network edge device based on at least one of a network condition and a network event.

52. The system of claim 44, wherein modifying the at least one implementation instruction for the set of functionality of the at least one abstraction layer comprises a translation at a network layer of a first address family IP address to a second address family IP address based on at least one of the set of business rules, a determination the optimized communication node or the optimized network edge device utilizing the second address family, at least one transport layer protocol, and the at least one session parameter.

53. The system of claim 44, wherein modifying the at least one implementation instruction for the set of functionality of the at least one abstraction layer comprises modifying at a transport layer a UDP by a translation of at least one of a source service port and a destination service port based on at least one of the set of business rules, the session type of the communication, and at least one application layer protocol.

54. The system of claim 53, wherein the at least one application layer protocol comprises at least one of an RTP and a SIP.

55. The system of claim 44, wherein modifying the at least one implementation instruction for the set of functionality of the at least one abstraction layer comprises modifying at an application layer an SDP containing at least one of a communication session announcement, a communication session invitation, and a session parameter negotiation data, wherein the modification at the application layer is based on at least one of the set of business rules, the session type of the communication session, and a translation at a network layer, and a modification at a transport layer.

56. The system of claim 55, wherein modification of the application layer occurs when the communication session at the application layer comprises at least one of an RTP and a SIP.

57. The system of claim 55, wherein modification of the application layer occurs if the translation occurs at the network layer or the modification occurs at a transport layer.

58. The system of claim 55, wherein modification of the application layer occurs if the translation occurs at the network layer and the modification occurs at the transport layer.

* * * * *